United States Patent [19]
Barzilai et al.

[11] Patent Number: 6,012,045
[45] Date of Patent: Jan. 4, 2000

[54] COMPUTER-BASED ELECTRONIC BID, AUCTION AND SALE SYSTEM, AND A SYSTEM TO TEACH NEW/NON-REGISTERED CUSTOMERS HOW BIDDING, AUCTION PURCHASING WORKS

[76] Inventors: Nizan Barzilai, 3400 N. 40th St.; Ron Davidson, 3390 N. 40th St., both of Hollywood, Fla. 33021

[21] Appl. No.: 08/886,492

[22] Filed: Jul. 1, 1997

[51] Int. Cl.[7] .................................................. G06F 17/60
[52] U.S. Cl. .......................... 705/37; 705/26; 379/93.12; 283/67
[58] Field of Search .......................... 705/26, 37; 380/25; 273/306; 283/67

[56] References Cited

U.S. PATENT DOCUMENTS

| | | | |
|---|---|---|---|
| 4,654,482 | 3/1987 | DeAngelis | 379/95 |
| 4,974,252 | 11/1990 | Osborne | 379/92 |
| 5,259,023 | 11/1993 | Katz | 379/88 |
| 5,282,633 | 2/1994 | Boylan et al. | 273/306 |
| 5,561,707 | 10/1996 | Katz | 379/88 |
| 5,611,051 | 3/1997 | Pirelli | 395/210 |
| 5,774,873 | 6/1998 | Berent et al. | 705/26 |
| 5,794,219 | 8/1998 | Brown | 705/37 |
| 5,803,500 | 9/1998 | Mossberg | 283/67 |
| 5,819,914 | 10/1998 | Fujisaki | 379/93.12 |
| 5,835,896 | 11/1998 | Fisher et al. | 705/37 |
| 5,845,265 | 12/1998 | Woolston | 705/37 |
| 5,862,223 | 1/1999 | Walker et al. | 380/25 |

FOREIGN PATENT DOCUMENTS

| | | | |
|---|---|---|---|
| 0628920 | 12/1994 | United Kingdom | G06F 15/24 |

OTHER PUBLICATIONS

Going Once. Going Twice. Cybersold, BusinessWeek, Aug. 11, 1997.

Experience the Napa Valley Wine Auction Without Ever Leaving Home. Business Wire, Palo Alto, California, Jun. 4, 1996.

World's First Real–Time Travel Auction Service to be Available Via World Wide Web; ETA to Open Bidding to Consumers, Travel Industry; Web Auction Leader eBay to Provide Technology Support. Business Wire, Long Beach, California, Nov. 4, 1996.

Virtual Vineyard and Sun Microsystems Give Napa Valley Wine Auction Global Reach. Business Wire, Palo Alto, California, Apr. 22, 1997.

*Primary Examiner*—Allen R. MacDonald
*Assistant Examiner*—M. Irshadullah
*Attorney, Agent, or Firm*—Robert C. Kain, Jr.

[57] ABSTRACT

The computer-based method of selling consumer products and consumer services includes, in one embodiment, the utiltization of a computer system, which maintains the electronic bid, auction and sales records, and a plurality of customer computers interconnected with the computer system via a telecommunications link. The computer system electronically establishes a virtual showroom accessible by the customer's computers which displays consumer goods and services and information regarding the commonly available selling price for each product and service. For example, the system displays the manufacturer's suggested retail price or MSRP, a minimum opening bid price, information regarding the make, model and manufacturer or distributor of the offered product or service, and bid cycle data revealing the open, close and acceptance dates for the bids. The computer-based method electronically posts all bids made by bidders on the products and services during the bid period. The system accepts the highest bid while excluding bids greater than the lowest high bid from a single bidder. The system further electronically consummates the sale. Each bid costs the bidder a predetermined amount of money. The system also provides an electronic bid, auction and sale game. The computer-based method also electronically posts all winning and accepted bids thereby documenting the sale of the plurality of products and services purchased by the bidders.

21 Claims, 13 Drawing Sheets

MEMBER ACCOUNT ACTIVITY

MEMBER NAME
MEMBER PSE                    ADDRESS
                              PHONE

PERIOD DATE 3-1-97 THRU 6-1-97

| CHRONO<br>BID DATE | ITEM DESCR.<br>SHORT FORM [$ A-BID] | SUBMITTED<br>BIDS | ACCEPTED<br>BIDS | SHIP<br>DATE | CONFIRM<br>NO. |
|---|---|---|---|---|---|
| MAY 1, 1997 | NIKE SHOES | $22, 27, 32, 38 | 32 | 5-9-97 | XP321 |
| MAY 15, 1997 | PHANTOM TICKETS | $95, 125 | OPEN | | TP87 |
| MONTHLY BID CHARGES | SHOES 4X$3=$12<br>TICKETS 2X$5=$10 | SUBTOTAL | $22.00 | BILLED AMX | |
| APRIL 20 | WEST. STOVE [$265] | | N-A | N-A | |
| MONTHLY BID CHARGES | STOVE 2X$10=$20 | SUBTOTAL | $20.00 | BILLED AMX | |
| MARCH | | | | | |
| NO BIDS SUBMITTED | | | | | |

TOTAL BID CHARGES THIS PERIOD .................................... $32.00

TOTAL SAVINGS FROM MSRP   SHOES $45-32 = $13.00 SAVINGS

[MBR DATA]  [MBR HISTORY]  [ITEM SELECT DESCR.]  [PREVIOUS PAGE]  [INTRO SCREEN]  [RULES]

FIG. 7

SAMPLE SALES

MFGR. – BRAND – MODEL NO. _____
          MSRP $ _____
          SOLD $ _____
          EST. SAVINGS $ _____
[ILLUS.]
ITEMS SOLD __n__
OPEN DATE ... CLOSE DATE
ACCEPTANCE DATE

MFGR. – BRAND – MODEL NO. _____
          MSRP $ _____
          SOLD $ _____
          EST. SAVINGS $ _____
[ILLUS.]
ITEMS SOLD __n__
OPEN DATE ... CLOSE DATE
ACCEPTANCE DATE

MFGR. – BRAND – MODEL NO. _____
          MSRP $ _____
          SOLD $ _____
          EST. SAVINGS $ _____
[ILLUS.]
ITEMS SOLD __n__
OPEN DATE ... CLOSE DATE
ACCEPTANCE DATE

MFGR. – BRAND – MODEL NO. _____
          MSRP $ _____
          SOLD $ _____
          EST. SAVINGS $ _____
[ILLUS.]
ITEMS SOLD __n__
OPEN DATE ... CLOSE DATE
ACCEPTANCE DATE

[MBR NEW ACCT.] [MRCH. RVW.] [PREVIOUS IMAGE] [INTRO HOME PAGE] [RULES] [MORE STUFF]

FIG. 10

COMPUTER-BASED ELECTRONIC BID, AUCTION AND SALE SYSTEM, AND A SYSTEM TO TEACH NEW/NON-REGISTERED CUSTOMERS HOW BIDDING, AUCTION PURCHASING WORKS

The present invention relates to a computer-based method of selling or purchasing consumer products and consumer services via an electronic bid, auction and sale system.

BACKGROUND OF THE INVENTION

U.S. Pat. No. 5,561,707 to Katz discloses a telephonic interface statistical analysis system which can be utilized in conjunction with auction sales. U.S. Pat. No. 4,974,252 to Osborne discloses an interactive commercial/entertainment network. The Katz system utilizes a Touch Tone or DTMF telephone unit as an input. The Osborne system utilizes a especially configured remote control input unit, provided to each patron in a theater or a data acquisition location, to select one or more items displayed in the theater. U.S. Pat. No. 5,259,023 to Katz discloses another telephonic interface statistical analysis system which utilizes a Touch Tone telephone as an input. U.S. Pat. No. 4,654,482 to DeAngelis discloses a home merchandise ordering telecommunications terminal. U.S. Pat. No. 5,611,051 to Pirelli discloses a point of supply, use and distribution process and apparatus. To dispense inventory to consumers, the Pirelli system utilizes a card imprinted with a personal user bar code or optical scan code.

In Israel, a magazine called "The Country Auction" enables purchasers, reviewing the magazine, to bid on products and services illustrated in the magazine. This Israeli magazine includes photographs of the products offered for sale, the suggested retail price for those products, and information regarding when bids can be made on those products. Potential bidders place a telephone call to a call center in order to place one or more bids on certain products or services offered in the Israeli magazine. After the close date, the highest bid for the particular product or service is accepted by the magazine's operator while excluding bids from a single bidder which are greater than the lowest high bid from that single bidder. The operators of The Country Auction magazine system collect a fee for each bid placed by a caller.

OBJECTS OF THE INVENTION

It is an object of the present invention to provide a computer-based method of purchasing or selling consumer products and consumer services via an electronic bid, auction and sale system.

It is an additional object of the present invention to provide an electronic bid, auction and sale system utilizing a computer system that cooperates with a plurality of customer computers, operated by customers, whereby the computer system and the customer computers are linked via a telecommunications system. The telecommunications system may encompass the Internet.

It is a further object of the present invention to provide an electronic bid, auction and sale system wherein the computer system establishes a virtual showroom which electronically displays the products and services offered for sale and certain other information, such as the manufacturer's suggested retail price, minimum opening bid price and bid cycle data which enables the potential purchaser or customer to view the product, view information regarding the product and place a bid or a number of bids to purchase the product.

It is an additional object of the present invention to permit the user to place a reasonable number of bids (up to 8 bids in a preferred embodiment) on a single product or service whereby the system accepts (a) the highest bid submitted by all bidding customers and (b) excludes all bids greater than the lowest high bid from a group of bids submitted by a single bidder for the *particular product or service.

It is an additional object of the present invention to electronically post, for public display, all winning and accepted bids and, in a preferred embodiment, a predetermined number of non-winning bids proximate to the winning and accepted bids.

It is another object of the present invention to provide a role play or game routine which potential customers can play in order to learn the rules for the electronic bid, auction and sale system and to provide entertainment to actual and potential customers.

SUMMARY OF THE INVENTION

The computer-based method of selling consumer products and consumer services includes, in one embodiment, the utilization of a computer system, which maintains the electronic bid, auction and sales records, and a plurality of customer computers interconnected with the computer system via a telecommunications link. The computer system electronically establishes a virtual showroom accessible by the customer's computers. This electronic showroom includes electronic displays of a plurality of consumer goods and services which are offered for sale. Further, the showroom displays information regarding the commonly available selling price for each product and service. For example, the system displays the manufacturer's suggested retail price or MSRP, a minimum opening bid price, information regarding the make, model and manufacturer or distributor of the offered product of service, and bid cycle data revealing the open, close and acceptance dates for the bids. The computer based method electronically blocks customers from becoming bidders and posting bids until those customers have electronically preregistered. Preregistration may occur completely electronically or with an audio telecommunications link or via a voice communications center. The computer-based method electronically posts all bids made by bidders on the plurality of products and services during the bid period. The system accepts the highest bid submitted for sale of one of the plurality of products and services from all bids submitted by all bidders while excluding bids greater than the lowest high bid from a single bidder. The system further electronically consummates the sale of the product or service to the highest bidder via an electronic confirmation to the winning bidder or purchaser. Further, the system accepts an electronic payment of funds from each bidder for each bid based upon the number of bids submitted by the bidder. In other words, each bid costs the bidder a predetermined amount of money. For customers who have not preregistered, the system provides an electronic bid, auction and sale game wherein customers place fictitious bids, the computer system generates a plurality of computer generated fictitious bids responsive to the customers' fictitious bids, the computer system fictitiously accepts the highest bid while excluding all fictitious bids greater than the lowest high fictitious bid from a single customer and fictitiously accesses a charge for each fictitious bid submitted by the customers during the game. The computer-based method also electronically publicly posts all winning and accepted bids thereby documenting the sale of the plurality of products and services purchased by the bidders. In a preferred embodiment, the winning and accepted bids are electronically publicly displayed along with a predetermined number (10–20) of non-winning bids proximate to the winning and accepted bids.

BRIEF DESCRIPTION OF THE DRAWINGS

Further objects and advantages of the present invention can be found in the detailed description of the preferred embodiments when taken in conjunction with the accompanying drawings in which:

FIG. 7 diagrammatically illustrates a screen display showing member account activity table or data file;

DETAILED DESCRIPTION OF THE PREFERRED EMBODIMENTS

The present invention relates to a computer-based method of purchasing or selling consumer products and consumer services via an electronic bid, auction and sale system.

Figure 1:
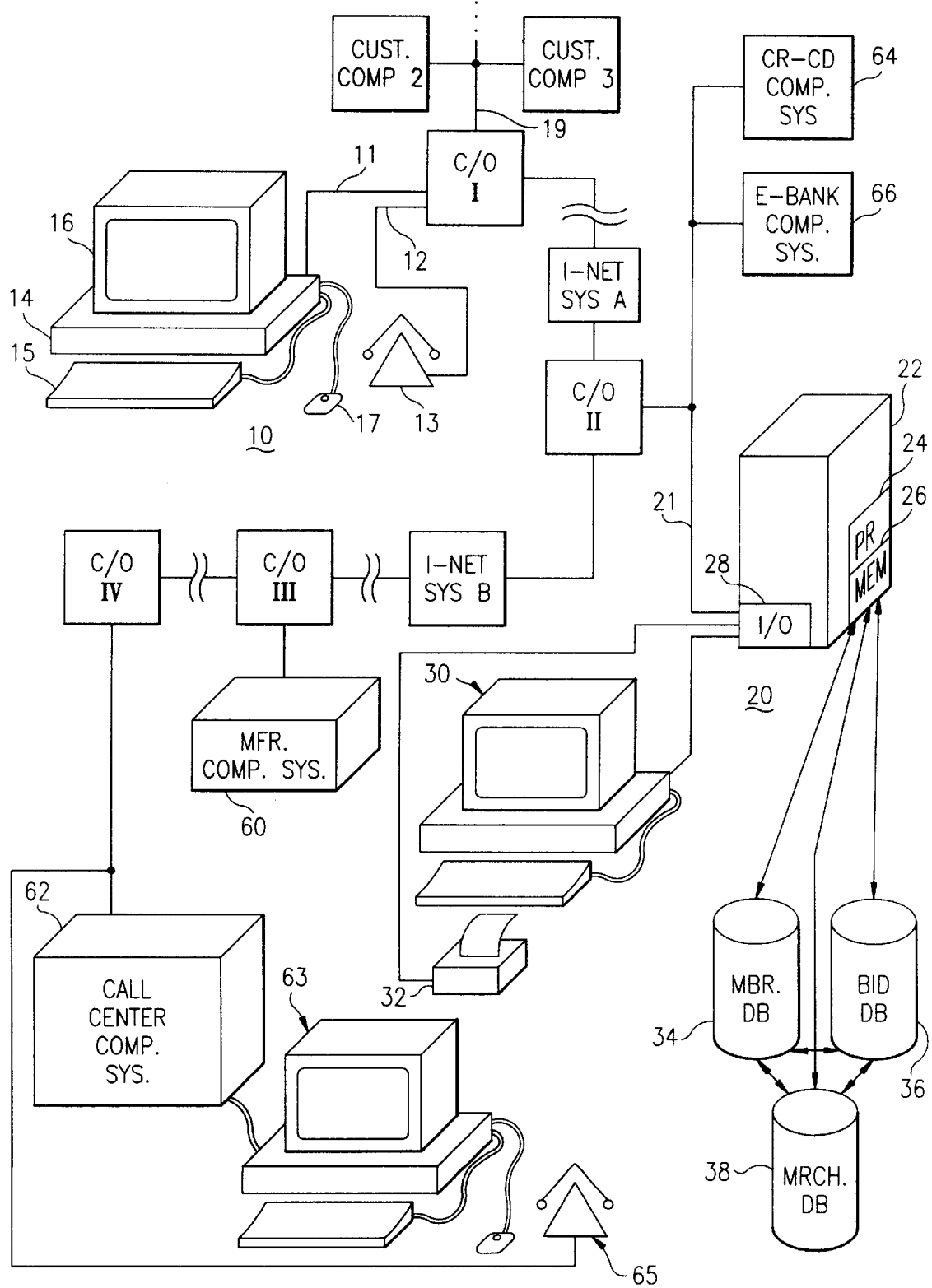
FIG. 1 diagrammatically illustrates the computer-based system, a plurality of customer computers, a call center computer system, credit card, electronic bank and manufacturer computer systems and the Internet linking voice and data telecommunications system.

FIG. 1 diagrammatically illustrates customer computer system 10 electronically connected via a telecommunications system having telecommunications lines 11, 12 to central office I. Telecommunications line 12 is connected to a voice communications equipment 13. In the illustrated embodiment, this is a Touch Tone or DTMF telephone. Alternatively, the voice communications equipment may be integrated into customer computer system 10. Computer system 10 includes a central processing unit 14 (having a central processor, random access memory, read only memory, preferably a hard drive memory, input and output interface cards, and other commonly available computer elements equipment), a keyboard 15, a monitor 16 and a mouse or track ball 17. Customer computer systems 2 and 3 are also interconnected via telecommunications line 19 to central office I. The telecommunications system is an interlinked system linking central offices I, II, III and IV. Some of these central offices are also connected to Internet computer systems A and B.

The electronic bid, auction and sale system primarily resides on computer system 20 which is linked to the telecommunications system via telecommunications line 21. Line 21 may be a T1 or larger telecommunications line. Computer system 20 includes a central processing unit 22 including a processor 24, memory 26 and an input/output device 28. Memory 26 includes random access memory, read only memory, hard drive memory, removable drive memory and backup memory. Input/output interface 28 is connected to telecommunications line 21 and computer work station 30. Printer 32 is also coupled to input/output unit 28.

Memory 26, by way of example, captures various data generally identified and located in membership data base DB 34, bid data base 36 and merchandise data base 38. In general, potential customers become members by registering with the member data base 34. Prior to becoming members, these customers may be permitted to role play or game play the electronic bid, auction and sale system. The bid, auction and sale system is generally handled by bid data base 36. Merchandise data base 38 includes information regarding consumer products as well as information regarding consumer services. As such, when used herein, the term "merchandise" refers to both consumer products as well as consumer services.

The telecommunications system links computer system 20 to one or more manufacturer's computer system 60, to call center computer system 62, to credit card computer system 64 and to electronic or E-bank computer system 66.

Call center or voice communications center computer system 62 includes work station 63 and voice communications equipment 65. Voice communications equipment 65 enables the operator at call center computer system 62 to provide an audio telecommunications link with the customer, member or user as necessary. Of course, call center computer system 62 could be integrated with the electronic bid, auction and sale computer system 20 rather than being electronically linked together via the telecommunications system.

The following Definitions Table may assist in the understanding of the present invention.

DEFINITIONS TABLE

| | |
|---|---|
| web.com | Internet address on the web |
| SKU | Standard inventory - manufacturer number used to track sales of product (optical scan code) |
| MSRP | Manufacturer's suggested retail price |
| DB | data base (or similarly configured spread sheet) |
| Scn | Screen or displayed elements |
| Co. e-mail | Company electronic mail box |
| Mrch. | Merchandise (also refers to services) |
| Member Pse | Member pseudonym (also Mbr. Pse) |
| a-bid | accepted bid |
| Mbr | member |
| e-sig. | electronic signature |

One of the primary embodiments of the present invention is the implementation of the electronic bid, auction and sale system on the Internet. As it is well known, the Internet is a relatively large number of substantially independent computer systems (A and B) linked together via a telecommunications system. This telecommunications system consists of a large number of telephone lines but also includes long distance telephone lines, satellite communications and other telecommunications routes. The telecommunications system not only handles the electronic data transfer between various computer systems, but also handles voice or audio communications. When certain aspects of the present invention can be carried out via an audio telecommunications link or a voice telecommunications link, that feature of the present invention will be discussed in an appropriate manner. However, most of the electronic bid, auction and sale system can be implemented in a completely electronic environment. Certain additional enhancements can be added such as computer generated voice annunciations from the system 20 to guide the user through various programs.

Figure 2:
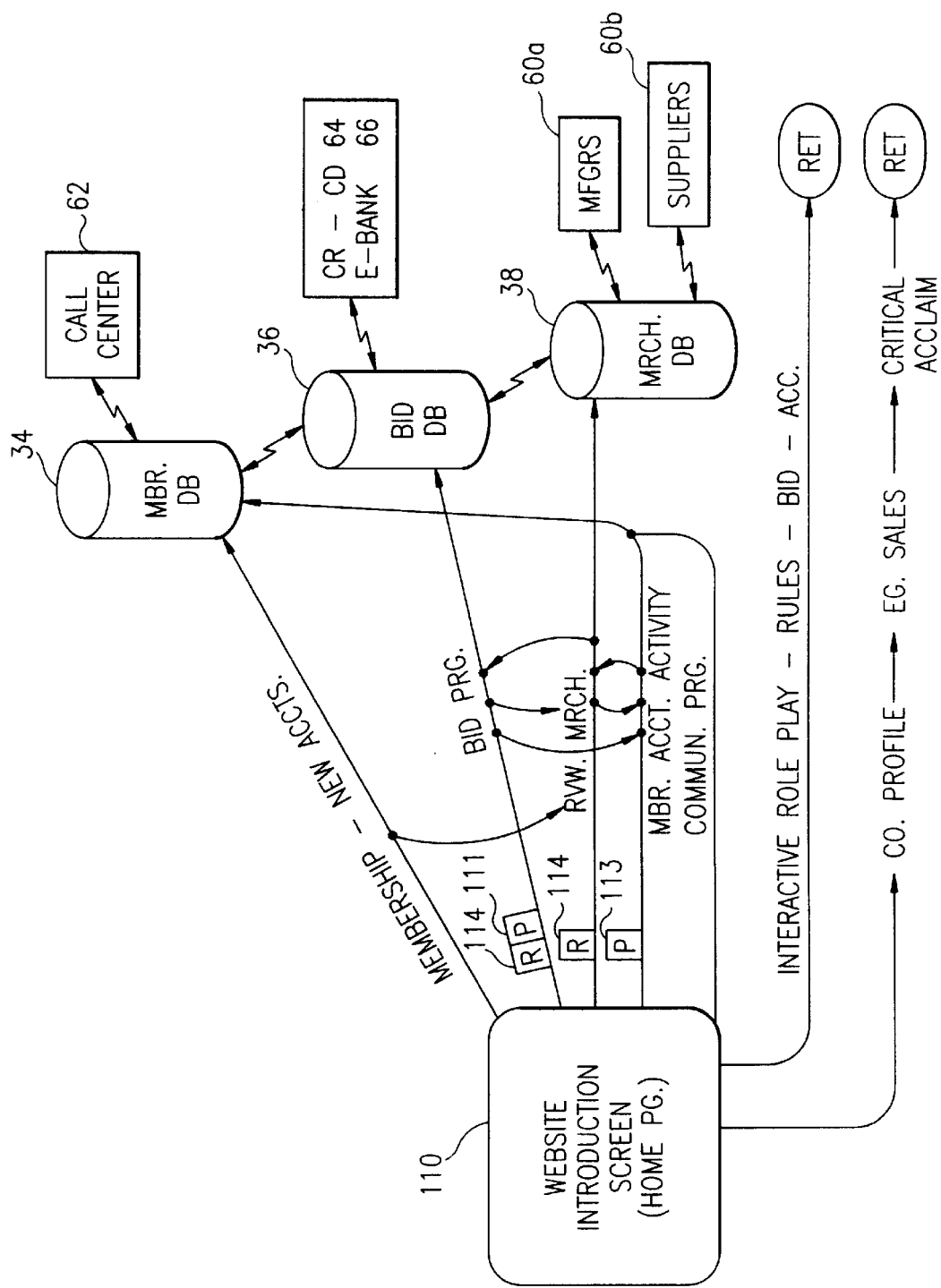
FIG. 2 diagrammatically illustrates an example of the design of a computer-based method of purchasing or selling consumer products and services showing the introduction screen or home page and various branches and internal cross-links to other sources of data (an exemplary flow chart)

FIG. 2 diagrammatically illustrates the Website, home page or introduction screen 110 electronically presenting the bid, auction and sale system which generally resides in computer system 20 in FIG. 1. Sometimes, introduction screen 110 is identified as a "home page". Users, customers and members of the bid, auction and sale system can access certain computer programs, data and routines via introduction screen 110. These programs and data are accessed by placing and activating a cursor on a selected location on the display screen. Transfers between programs or data are sometimes called "inter-links" or "cross-links" herein.

In a preferred embodiment, certain programs can be accessed by all users or customers. Other programs can only be accessed with a password. The password control in FIG. 2, is diagrammatically illustrated as P. The bid program and the member account activity program are not open to all customers or members unless they have password P111 and password P113. Also, rules regarding the bid, auction and sale of products and services are periodically displayed to the users or customers accessing the system. In FIG. 2, these rule displays are diagrammatically illustrated with R. For example, bid program and review merchandise program are accessed only after rules R114 are displayed to the customer. The foregoing password control and rule display is only exemplary in nature.

The customer, after retrieving the introductory screen via the Internet or telecommunications system, can enter the electronic bid, auction and sale system by accessing the membership-new account program, the bid program, the review merchandise program, the member account activity program, the communications program, the interactive role play or game play program, or the company profile/example sales program.

Certain of these programs or data displays enable the customer to jump from one program to another program. For example, the membership program enables the customer to jump or cross-link from the membership or registration system into the review merchandise program. As discussed later, the review merchandise program provides the user or customer with an electronic display of merchandise. This electronic display of merchandise includes illustrations of the products and, where appropriate, illustrations of the services. For example, the customer or member may purchase a vacation from the bid, auction and sale provider. This vacation package can be illustrated by photographs of the destination or destinations, the hotels, restaurants and other facilities. As described earlier, the term "merchandise" refers to consumer products or goods as well as consumer services.

A new member or a registered customer may jump or cross-link from the membership routine to the review merchandise routine if he or she wants to purchase or bid on one or more products or services offered by the system operator on computer system 20. From the review merchandise routine, the member, user or customer may jump to the bid program. In the bid program, the customer places one or more bids on a particular product or service. Since the customer may want to bid on more than one product, a cross-link from the bid program to the review merchandise program is diagrammatically illustrated in FIG. 2.

From the review merchandise program, the user may want to access his or her member account activity screen or file. As described later, this activity file is unique to each member and shows the current status of all outstanding bids and certain historic data. Historic data includes, for example, bids not accepted as winning bids by the system and bids which were accepted. Access to the member account activity program is provided from the bid program as well as the review merchandise program after the user supplies an appropriate password or access control data. After reviewing his or her account, the customer or user may want to return to the review merchandise program or the bid program to make a bid on a particular product or service. The temporary bid file (described later) may be compiled as part of the bid program or the member account routine.

The membership-new account program interacts with the member or customer data base. Further, the member data base may be interactively connected to the call center 62. As explained later in conjunction with FIG. 3, the call center may be activated to gather membership or customer information, gather or obtain credit card data from customers, clear credit card transactions with customers and with the credit card clearinghouse, and audibly confirm winning bids and consummate the sales of products and services via an electronic charge to a credit card or to electronic E-bank account.

The bid program interacts with bid data base 36. Bid data base 36, as explained later, accesses credit card computer system 64 and/or electronic bank computer system 66. Each bid placed by each customer or member has a charge associated with it. This bid charge, although small ($2.00–$10.00 per bid) is automatically charged to the customer's credit card or electronic bank account. Dependent upon the traffic on the system and the value of goods and services sold thereon, the bid charges may be higher or lower than currently estimated.

The review merchandise routine interacts with the merchandise data base. The merchandise data base has a large amount of data describing the products and services offered by the system. Merchandise data base 38, under the control of the system operator, electronically interacts with the computer systems of various manufacturers 60a as well as the computer system for various suppliers 60b. In an expanded version, after a winning bid or bids have been awarded and electronically confirmed with the bidders, computer system 20 will generate electronic "ship merchandise" orders to the suppliers' computers 60a and 60b. Electronic payment for these goods is also accomplished with computer systems 20, 60a, 60b, 64, 66.

The member account activity program generally interacts with information stored in the member or customers data base 34.

The communications program generally gathers information from the member or customer and funnels this information through the membership data base to either the system operator or the call center 62.

The interactive role play or game play routine provides existing members and potential members or customers with the rules explaining the bid, auction and sale of merchandise as well as enables the potential member to game play by bidding on one or more items. Although not shown in FIG. 2, the interactive role or game play routine is cross-linked to the membership routine and the review merchandise routine. If the potential member likes the game, he or she is prompted to become a registered member and place actual bids on the products and services.

Lastly, the customer or member accessing the introductory screen or Website of the system can select the company profile. The company profile displays the credentials of the system operator. In addition, this program may provide the potential customer with a list of goods and services recently sold to customers. Critical acclaim or reviews can also be posted with the company profile. Of course, cross-links from the company profile routine are provided to the membership routine, the bid program, the review merchandise and the communications program. The data path flow illustrated in FIG. 2 provides an example of the type of data flow in the system.

Although separate data bases for membership and merchandise have been illustrated herein, a single integrated system may be utilized. The data structure set forth herein is an example of the necessary data management protocol.

Figure 3:
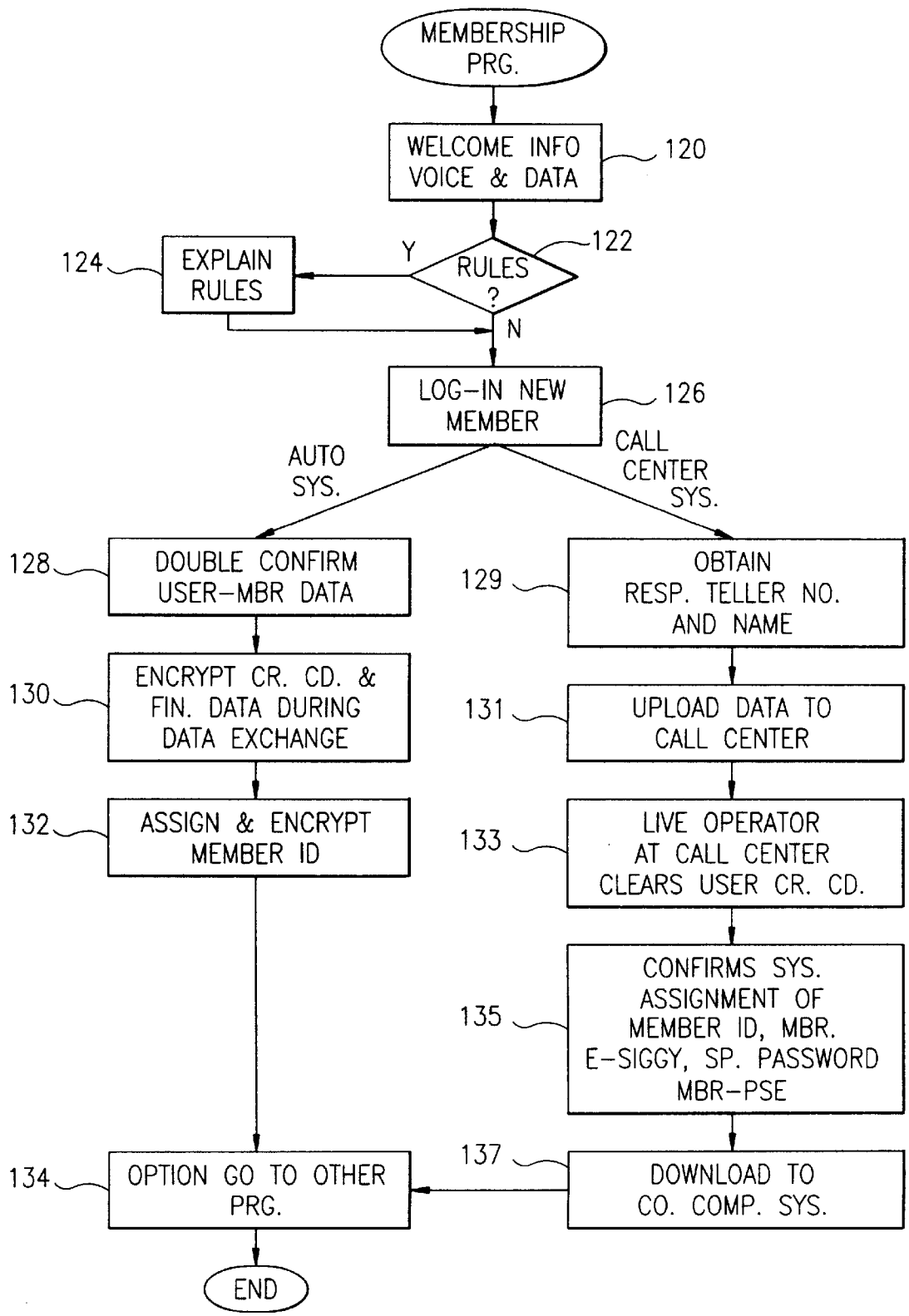
FIG. 3 diagrammatically illustrates the membership program which may be accessed by a customer or a call center system.

FIG. 3 diagrammatically illustrates the membership or customer program. Step 120 welcomes the customer or member to the Website. Voice as well as text and visual or video information may be presented to the potential customer or member. Decision step 122 determines whether the customer wishes to review the rules regarding the bid, auction and sale system. For example, one of the rules provides that only consumers may access this system. Further, a consumer may only buy one unit offered for sale. As an example, the system may offer for sale 200 pairs of NIKE shoes. However, the customer or member can only bid on and can only purchase one pair of the 200 pairs of NIKE shoes offered for sale. If the YES branch is taken from decision step 122, the system explains rules in step 124. If the NO branch is taken, the system in step 126 logs in and electronically records member information. At this time, the system may activate an automated membership or customer routine or may pass control to the call center 62.

The Membership Data Base File-Screen Table provided below indicates some general information that may be collected on each new member or customer.

Membership DB File-Screen

Member name
Member nickname/pseudonym
Member electronic signature
Member ID (assigned by system)
Special password data
Address, phone
E-mail address
Sign-on date (sys.)
Log-on count (sys.)
Credit card no.
- expiration date
- approved credit limit
E-Bank data
- Bank name
- Account no.
- Web address
- Clearance code
Cross Links: Co. e-mail; merchandise showroom program; bid program If the automated route is taken, in step 128, the system confirms the membership data input by the user. In a sophisticated system, the new member would type in his or her name, provide the system operator with a nickname or pseudonym PSE and would provide the system operator with a member electronic signature e-sig. With the advent of electronic signature laws, individuals are capable of utilizing a specific electronic signature which has the same legal effect as his or her hand written signature. In addition to this name and recognition information, the system requires, in a preferred embodiment, special password data. This special password data may include the customer's mother's maiden name. This special password data is utilized by the system to safeguard very critical information. Critical information in this regard is the member account activity information. Further, this special password data can be utilized to further confirm the validity of a member if the member seeks to change his or her address or password in the appropriate data base. The member's address, telephone, e-mail address, credit card information, and electronic bank (E-bank) data is also requested and obtained by the system. In step 130, the system encrypts credit card data and financial data exchanged during the input and confirmation routines. Common encryption routines can be utilized (PGP, etc.). Financial data includes, among other things, information regarding the bank account for the electronic bank E-bank.

In step 132, the system assigns and encrypts the member identification. After the member has completed the input of this information, the system assigns a sign-in date in the membership data base as well as increments the log-on count. This log-on count data indicates the number of times the member has logged into the system 20. In step 134, the member or registered customer can jump to other programs. In the membership DB file-screen, this is indicated by cross-links to the company e-mail (the communications program), the merchandise showroom program or the bid program. In the absence of selecting a cross-link to another program, the membership program ends. As a default, the customer could be linked to the merchandise program.

If an audio system or live operator system is implemented, system 20 after step 126, activates the call center system routine. In step 128, the potential customer or potential new member leaves his or her name and a responsive telephone number with the system operator at system 20. In step 131, this information is uploaded to the call center computer system 62. In step 133, a live operator at call center computer system 62 calls the potential customer or new member. This voice link then obtains the credit card and other financial information from the customer. In step 135, the call center computer system 62 downloads this information into computer system 20 after the call center confirms the assignment of a member identification number, member electronic signature, special password and member nickname or pseudonym. In step 137, this information is downloaded to computer system 20.

Figure 4A:
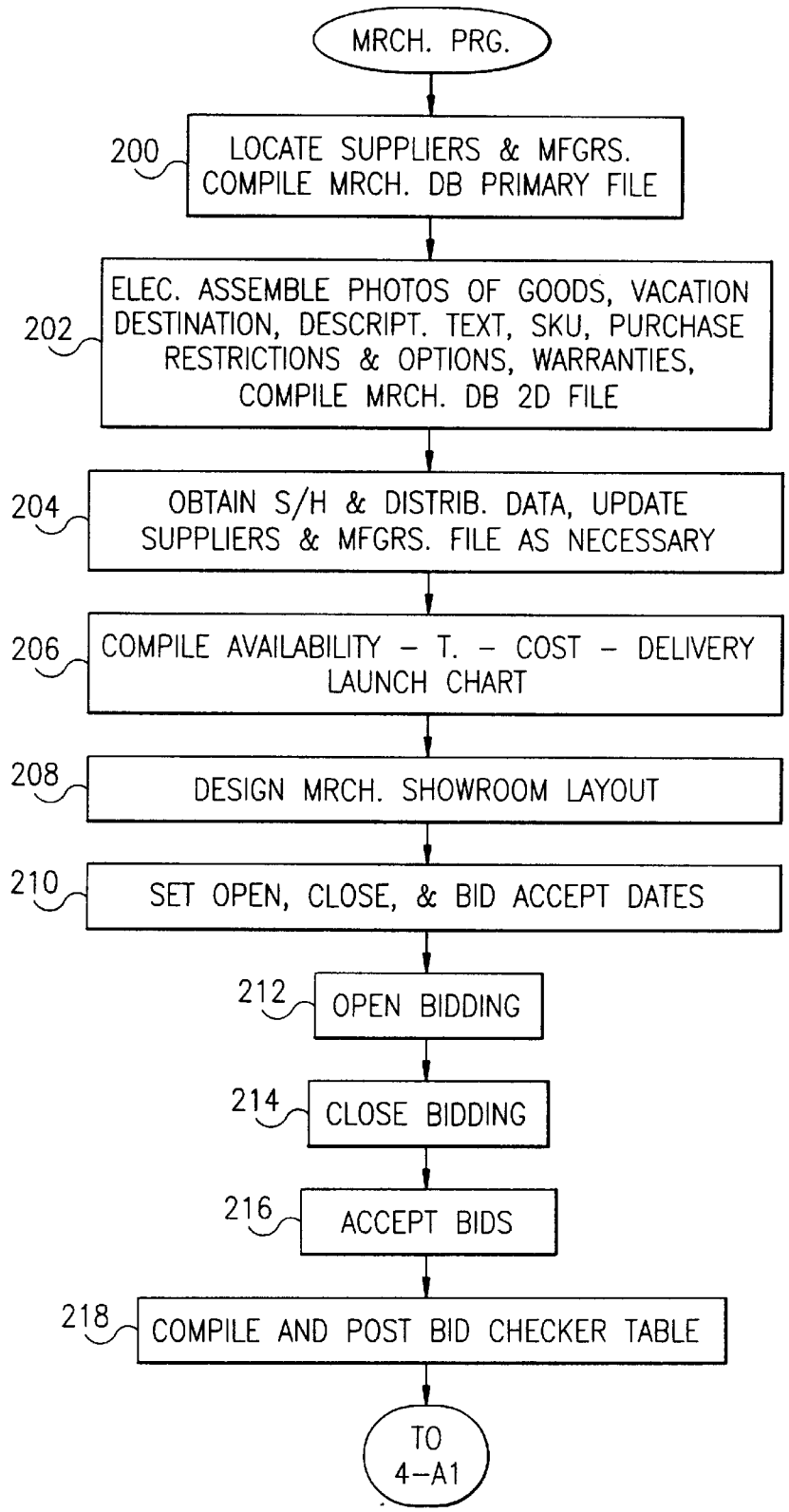
FIGS. 4A and 4B diagrammatically illustrate a merchandising program.
Figure 4B:
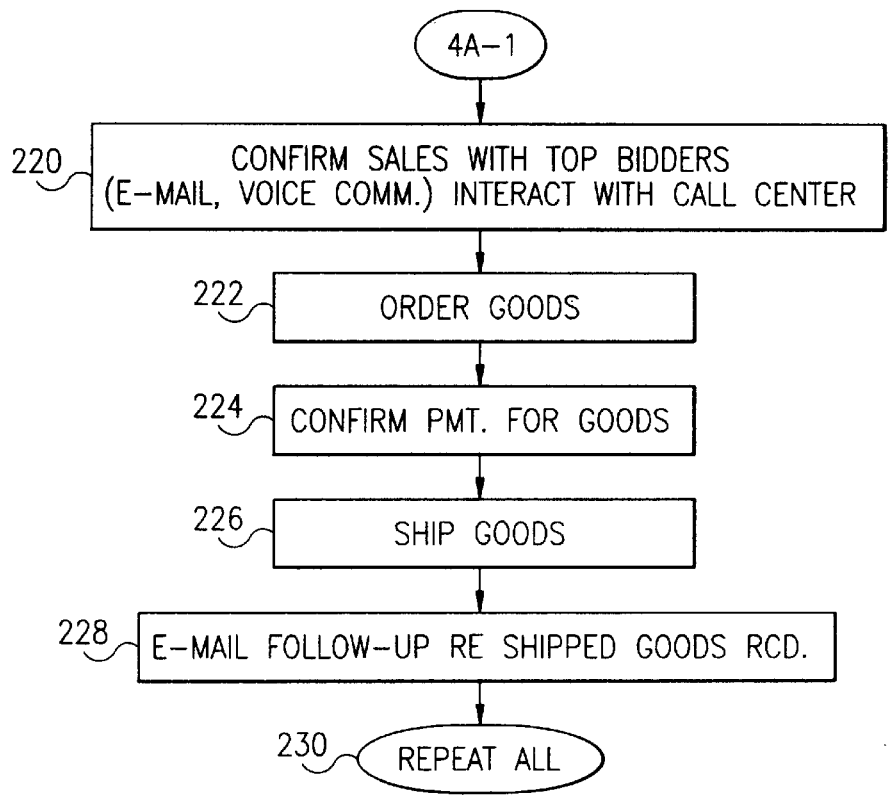

An important aspect of the present invention is the merchandising program diagrammatically illustrated in FIGS. 4A and 4B. In step 200, the system operator, operating computer system 20 (FIG. 1), locates suppliers and manufacturers for the products and services to be offered by the electronic bid, auction and sale program. The system operator compiles the merchandising data base primary file. The Merchandise Data Base Primary File-Screen Table, or an example of such a file or data compilation is set forth below.

Merchandise DB Primary File-Screen

Supplier
  Name, contact person
  address
  phone
  web.com
  e-mail

Manufacturer
  Name, contact person
  address
  phone
  web.com
  e-mail
Warranty Provider
  Location
  phone, e-mail
Hyper Links: supp-web.com; mfg-web.com; warr-e-mail In order to properly operate the present computer system, information must be gathered regarding the manufacturer of each product, as well as the supplier or distributor of the product. Since the present invention relies heavily on a computerized system, warranty information can also be compiled and associated with the products and services offered for sale on the system. Not only details regarding the warranty, but also the location of the company who will fulfill and correct any warranty problem. The merchandise primary file also includes Internet addresses (web.com) and e-mail addresses. The merchandise primary file may enable the system operator to hyperlink to the supplier or manufacturer's website. Also, the system operator should be able to send e-mail to the warranty provider. In a highly integrated system, the user or customer may be provided with an inter-link to the manufacturer's website from the Item Description Screen Table (described later).

In step 202, the system operator electronically assembles photographs or illustrations of the goods or products, vacation destination, textual information or data describing the goods, the SKU or optical scan track information, purchase restrictions and options, warranties, and generally compiles the Merchandise Data Base Secondary File Screen Table set forth below.

Merchandise DB Secondary File-Screen

Supplier-Manufacturer data in horizontal format:
  a. item description (short form)
  b. SKU No.
  c. Number of available items
  d. MSRP
  e. opening bid
  f. cost
  g. shipping and handling cost
  h. opening date
  i. close date
  j. total bid count-this bid cycle
  k. average accepted bid The merchandise secondary file is a management tool which enables the system operator to quickly identify the item, the SKU number, the number of items available for sale (number of units available for sale), the manufacturer's suggested retail price (MSRP), opening and closing bids, shipping and handling data, cost to the system operator for those goods, the close date for the bids, the total bid count for this bid cycle and the average accepted bid. The merchandise secondary file is an internal management tool and is not open to the public. This information is important in order to monitor how many products have been sold (if 500 units or pairs of shoes are to be sold, how many pairs have been sold to date) as well as the average bid posted and the average accepted bid. The present system can be implemented either by the system operator purchasing the goods and carrying inventory or the system operator contracting with certain suppliers or distributors and paying for those goods as those goods are sold through the electronic bid, auction and sale system. Accordingly, the system may be enhanced to provide for inventory control and the direct purchase of goods by the system operator and subsequent re-sale of goods by the operator.

Figure 9A:
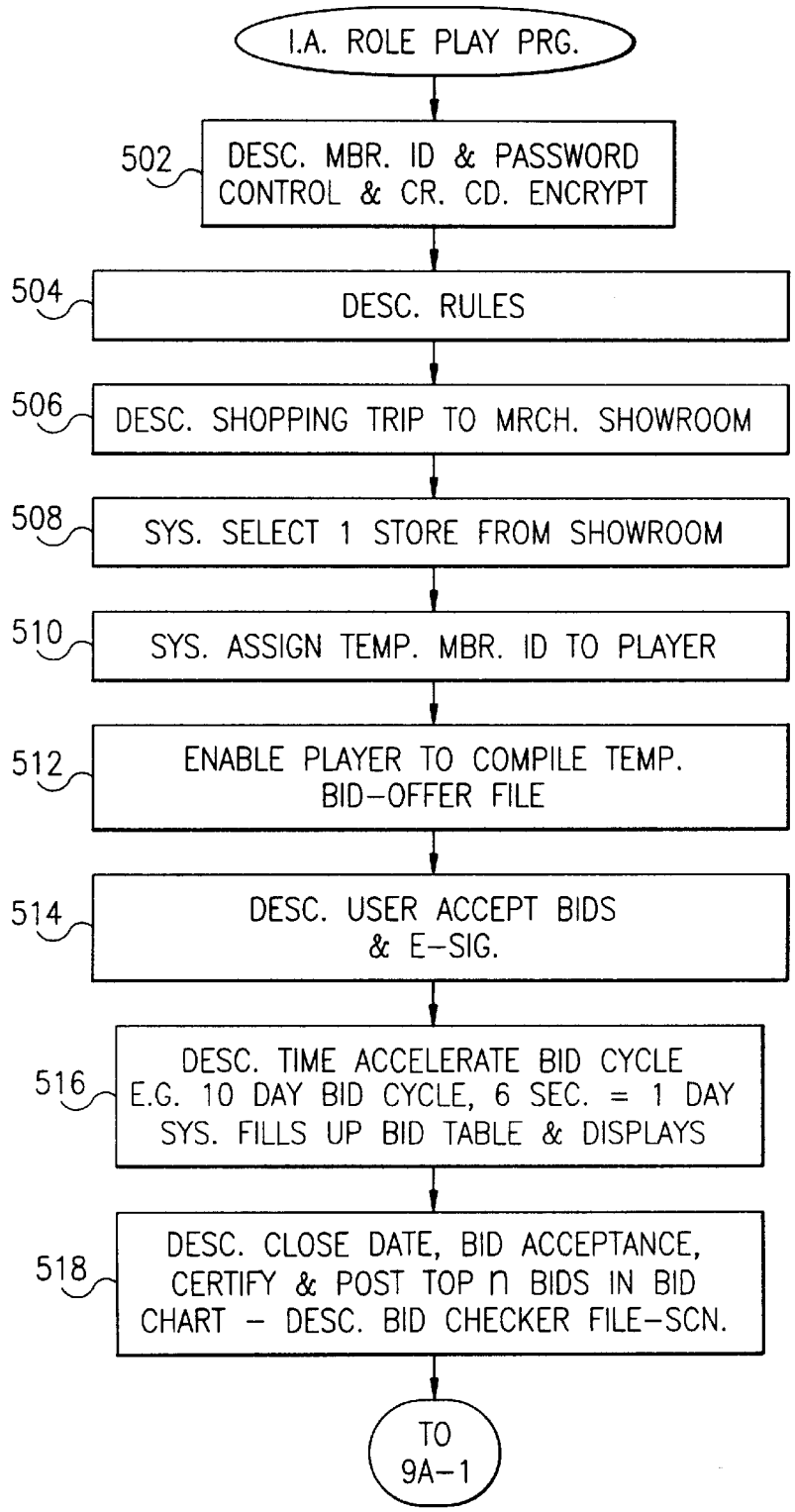
FIGS. 9A and 9B diagrammatically illustrate an interactive (I.A.) role play or game program; and, FIG. 10 diagrammatically illustrates a screen display showing sample sales of products to consumers.
Figure 9B:
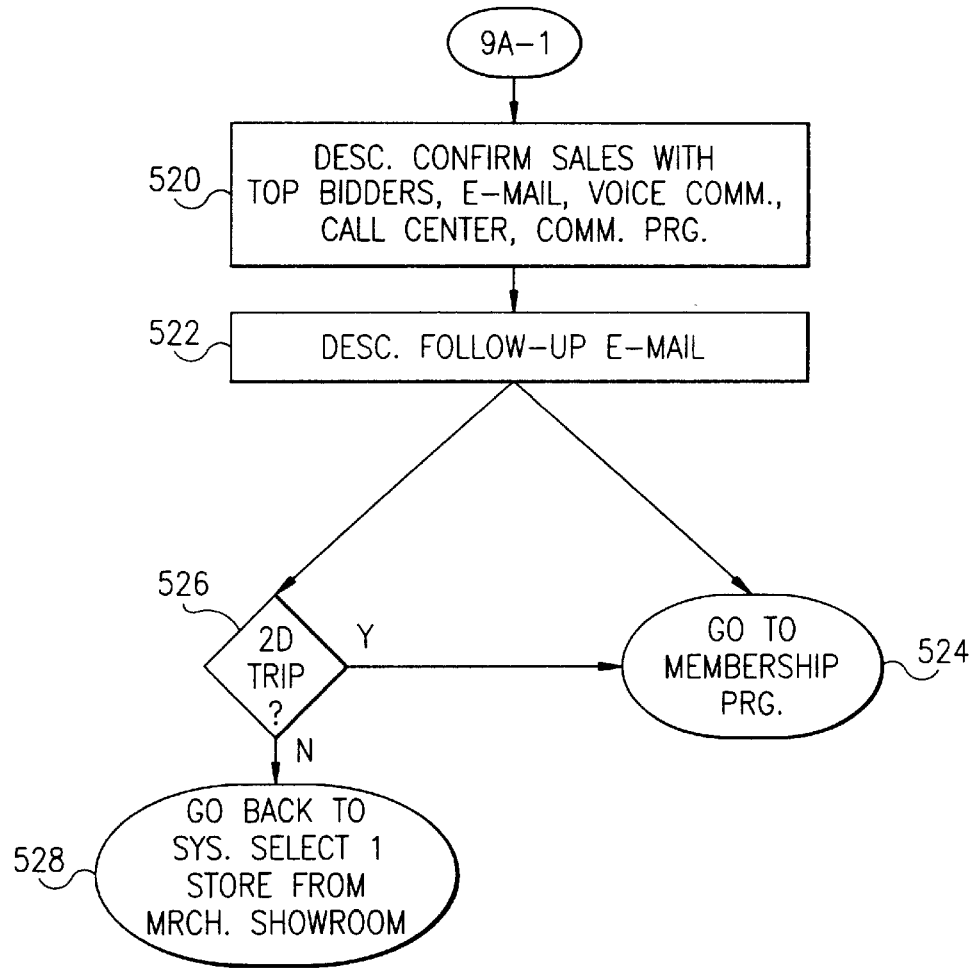

Step 204 obtains shipping and handling and distribution data, updates information regarding suppliers of the products and services and the manufacturers of the products and services as necessary. Step 206 compiles information regarding the availability of the products and services, the time factors involved in shipping those products to customers, the cost of those products, the manner of delivery of those products or services to the customers. Step 206 also contemplates the development of a "launch" chart which is a time diagram identifying what goods or services will be made available to members of the public during certain time frames. For example, automobiles may be sold only during the first full week of each month. Electronic devices may be sold during the second full week of each month. By carefully monitoring the traffic on the computer system, that is, the number of customers accessing computer system 20, the system operator can adjust the activity levels on the computer system to match the system's capability. The greater activity may require more restrictive access to the system and shopping available on the system. In this manner, system overloads and unacceptable customer wait times can be avoided. This is especially true regarding the auction, bid and sale game (FIGS. 9A, 9B). Further, the launch chart is used as a just in time inventory control for the purchase and distribution of merchandise.

In step 208, the system operator designs or lays out the electronic merchandise showroom.

Figure 5:
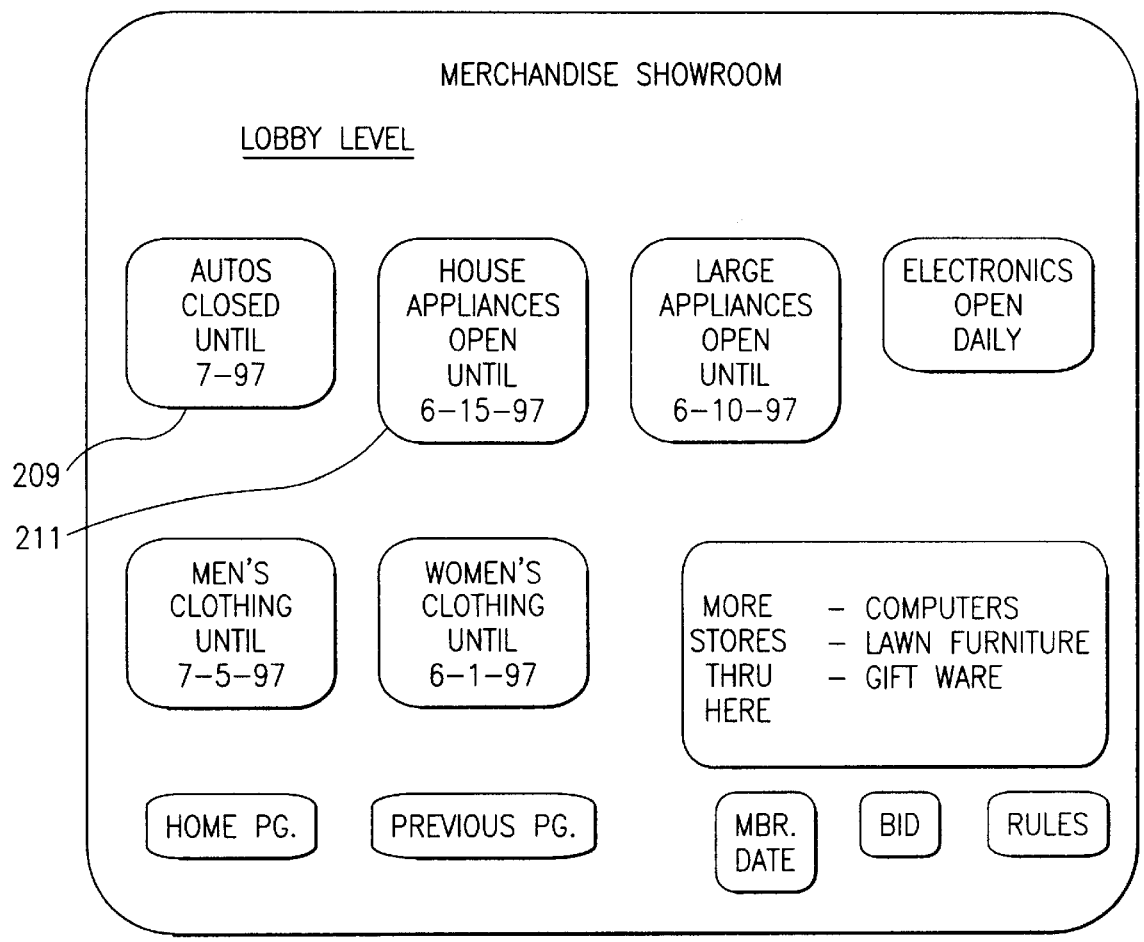
FIG. 5 diagrammatically illustrates a screen display showing a merchandise showroom.

FIG. 5 diagrammatically illustrates a merchandise showroom screen-lobby level. This merchandise showroom can show the products either in text or by illustration. Illustrations are preferable but download time to customers must be taken into account when designing the system. Screen area 209 provides an electronic entrance way to an exemplary automobile store. The merchandise showroom screen indicates that the automobile store will be closed until July, 1997. In contrast, house or home appliances store 211 is open to customers until Jun. 15, 1997. Large appliances are open until June 10. The electronic store is open daily. The products and services offered for sale through this system are functionally grouped together. It is believed that users may browse through the merchandise showroom and select one or more items and potentially bid for the purchase of one or more items from one of these electronic stores. However, it is beneficial to show the user at the lobby level or merchandise showroom screen that the system operator sells a wide variety for products and services.

The customer or member is also permitted to access the system operator's home page, go back to the previous page, access member data, access the bid program as well as access the rules unique to the electronic bid, auction and sale routine. These are cross-links to other data pathways.

Returning to FIG. 4A, in step 210, the system operator sets an open, close and bid acceptance date. Bids for a particular product or service will only be accepted after the opening date (and time, if necessary) and before the bid close date. The bid acceptance date should closely follow in time the bid close date.

In step 212, the merchandising program opens the bidding. In step 214, the merchandising program closes the bidding. In step 216 the system accepts one or more posted bids.

In order to monitor the transactions, the system operator also compiles a Merchandise Data Base Tertiary File-Screen Table. This tertiary file or table is an internal management tool. An example is shown below.

Merchandise DB Tertiary File-Screen

Supplier-Manufacturer data in horizontal format:
1. fields a, b, f, g, i, k (See Mrch. DB Secondary Table above)
2. List of all accepted bids
   - bid $
   - member id
   - bid posting date
3. billing data
4. payment data
5. ship date As an example, this tertiary file or screen shows the item description, the SKU number, the cost of the item, the shipping and handling cost, the close date for the bidding and the average accepted bid. In addition, the tertiary file lists all accepted bids. The tertiary file includes the amount of each accepted bid, the member ID and the bid posting date. The tertiary file also shows whether the member's credit card or E-bank account has been charged for the transaction, whether the credit card charges have cleared and whether the product has been shipped to the customer/member/purchaser. As the goods are electronically paid for, the charges clear the bank and the goods are shipped, this file is electronically updated.

In addition to the general merchandise information described above, each item, whether product or service offered for sale, must be electronically configured and displayed to the customer. The Item Description File-Screen (Common) Table shown below provides an example of this type of information.

Item Description File-Screen (Common)

Generic name
Brand name
Manufacturer/supplier
Model No.
SKU No.
Number of items available
MSRP
Minimum opening bid
Features
User feature selections
Warranty data
Purchase restrictions-options
Illustration of product, service provider vacation destination, etc.
Shipping and handling cost and delivery detail
Critical commentary or acclaim re: product or service
Cross links: to manufacturer; to bid program; to new member program The item description table includes information regarding the generic name of the product or service, the brand name, the manufacturer and/or supplier of the product or service, model number, SKU number, manufacturer's suggested retail price MSRP, and the number of units offered for sale through the system. For example, the system operator may contract with a distributor of Westinghouse refrigerators in order to sell 200 refrigerators during the month of August, 1997. These refrigerators must be identified by manufacturer, brand, the available colors of these refrigerators must be identified, and the suggested retail price should be posted to spur sales or bids on these units. The system operator identifies and posts a minimum opening bid. A customer's bid less than the minimum opening bid will not be accepted. With respect to the refrigerator example, the customer or user may be able to select the color of the refrigerator. Accordingly, the item description file or screen should show or be configured to show, if necessary, the color selection available to the customer/member/user. These are restrictions or conditions of the sale unique to each item offered for sale.

The item description file may also include warranty data, purchase restrictions or options, and illustrations of the product or service. Shipping and handling costs are necessary components of the sale of products and services through this system. As an example of options, the system operator may offer to sell a vacation package to the public. This vacation package may be broken down into a package for an individual, packages for couples, and packages for families. These various purchase restrictions or options should be located in the item description file.

In addition to the foregoing, cross-links or hyper-links may be provided from the item description file to the manufacturer, to the bid program, and to the new member program. Also, the item file may be separated into several files which the user can access as necessary. This may increase the utilization of space in the virtual shopping mall and reduce download time of data to the customer's computer 10.

Accordingly, after the user or member enters a particular store, for example, the electronic store in FIG. 5, the user clicks on or selects information regarding the sale of a fax machine. After the user or member selects the fax machine, the computer system displays an item description file or screen which provides the user/member/customer information regarding the fax machine or other selected product or service offered by the computer system operator. If the user or member wants to obtain additional information on the product, the user selects a hyper-link to the manufacturer of the product for additional information. Alternatively, the user can select the bid program and thereby place a bid on the illustrated item. If the member or customer had not preregistered with the system 20, the potential customer could select the new member cross-link and the system would direct and channel the potential customer to the new member program discussed above.

In addition to the item description file-screen (common), the system operator should have an additional data base information regarding the item. The Item Description File-Screen (Supplemental) Table shown below provides an example of some of this information.

Item Description File-Screen (Supplemental)

Common File-Screen
Open date
Close date
Acceptance date-time
Last sale date
Total bids this bid cycle
Total bids all cycles
Average accepted bid $ last bid cycle
Average open bids $ this cycle
Call frequency This supplemental file, accessible primarily by the system operator, includes the bid opening date, the bid close date and the acceptance time and date. Additionally, it may be useful for the system operator to track the last sale date of this item. The system operator may also want to know how many bids have been made on this product during the current bid cycle and how many bids have been made on this product for all bid cycles. The average accepted dollar amount of the last bid cycle is important as well as the average open bid amount for this bid cycle. The call frequency is also important data. The system operator, if offering a large quantity of similar goods, would like to know how successful this product has been in the past. By compiling information regarding the total number of bids made on this product for the last bid cycle as well as the total number of bids during the current open bid cycle, the operator judges the acceptance level of this product through the electronic bid, auction and sale system. Additionally, the average accepted bid for the last bid cycle provides the operator with information from which he can compute his or her profit margin. For example, if 200 pairs of NIKE shoes were offered for sale and the average accepted bid for those 200 shoes was $32, if the operator purchase those shoes at a cost of $25 per pair, a profit margin of $7 per pair is realized. If, on the other hand, the current average bid (posted by the system but not yet accepted because the bid cycle is still open) is $30, the system operator recognizes that his or her profit margin is less than the previous bid cycle. The call frequency information is useful in determining the traffic for that item based on day of the week and time of day.

Returning to FIG. 4A in the merchandising program, in step 218, the system compiles and posts the Bid Checker Table. One example of a Bid Checker File-Screen Table is set forth below:

Bid Checker File-Screen

Item Description (short form)
Open date . . . close date . . . Acceptance date
Bid Chart

| Member PSE | Member ID (Hidden) | Date of Bid | Bid Amount | Accepted Bid $ |
|---|---|---|---|---|
| M-PSE 1 | CU 849 | 5-1-97 | 38 | |
| M-PSE 1 | CU 849 | 5-1-97 | 32 | 32 |
| M-PSE 5 | (H) | 5-1-97 | 31 | |
| M-PSE 6 | (H) | 5-1-97 | 30 | |
| M-PSE 12 | (H) | 5-1-97 | 30 | |
| . | | | | |
| . | | | | |
| . | | | | |
| M-PSE 20 | (H) | 5-1-97 | 27 | |

Cross-Links: Intro. pg; Previous pg; Item Description (full); Rules; Member Account Activity The bid checker file enables all members or preregistered customers to determine what bid was accepted for a particular product or service. The Bid Checker File-Screen Table includes a short description of the item, the open, close and bid acceptance date and a bid chart. The bid chart shows the member pseudonym or nickname (M-PSE 1), the member's identification number which is hidden (H) except in certain situations, the date of the bid, the bid amount and the accepted bid. In the Bid Checker Table set forth above, the accepted bid has been underlined. The member ID number is only revealed to the system operator and is only revealed to the member whose ID number matches one of the hidden member ID numbers shown in the bid chart. In this example, member with the pseudonym M-PSE 1 has been assigned a membership or customer number CU 849. That member placed a bid of $38 on, for example, a pair of NIKE shoes. Member #1 placed that bid on May 1, 1997. The same member placed another $32 bid on the same pair of NIKE shoes. That $32 bid was accepted by the system as the highest winning bid from all bidders while excluding other higher bids from the same member. Of course, the bid chart cannot be compiled until after bids have been accepted. Members with pseudonyms 5, 6, 12 and 20 placed bids on the NIKE shoes on May 1, 1997. Those member bids were offers to purchase to NIKE shoes for $31, $30, $30 and $27. Since member #1's bid of $32 was higher than all other member's bids, member #1's bid of $32 was awarded.

An important feature of the present invention enables the customer or member to place multiple bids (in a preferred embodiment of up to 8 bids) on a single product or service. First, bids are awarded based on the highest bid from all bidders. Thereafter, the computer program excludes all bids greater than the lowest high bid from a single bidder. In the example shown above, member #1 placed two bids, $32 and $38 for the pair of shoes. Since the $32 was higher than all other bids from all other bidders (members 5, 6, 12, 20), that bid was accepted. Member #1's bid of $38 was not accepted because that bid was higher or greater than the lowest high bid from all bids made by member #1. The bid checker screen, accessed by various members after the bid acceptance date, will only show the member pseudonym, it will not reveal the member's name or ID. The member's ID number is hidden to everyone except the system operator and each respective member in order to insure confidentiality of members. The bid checker screen is made available to all preregistered customers or members in order to establish creditability of the present electronic bid, auction and sale system. In a preferred embodiment, the bid chart is certified or confirmed by an independent accountant or other authority. Cross-links to the home page, previous page, full description of the item sold, rules and member account activity is provided from the bid checker screen.

Returning to FIG. 4A, the system after step 218 jumps to jump point 4A-1 in FIG. 4B. Step 220 confirms the sale of the product or service with the top or winning bidders. This confirmation occurs via electronic mail or by voice communication via the call center computer system. If the call center is activated, computer system 20 (FIG. 1) electronically uploads the correct information to the call center computer system 62. At the call center, a voice channel or audio link is established between the call center and the customer/member. During this voice communications session or, during an e-mail communication, the customer/member confirms the sales price and the purchase of the product. The method of payment for the product is also confirmed. In the call center situation, the call center would then download the confirming information to computer system 20. In step 222, the system operator orders the goods, preferably electronically. In step 224, the system operator confirms that the customer/members has paid for the goods. If payment is made by credit card or E-bank, an electronic transfer of funds is completed. In step 226, the system confirms the shipment of goods. In step 228, the system sends an e-mail communication to the member/customer to determine whether that customer has received the goods. Step 230 repeats all of the foregoing steps for all merchandise.

Figure 6A:
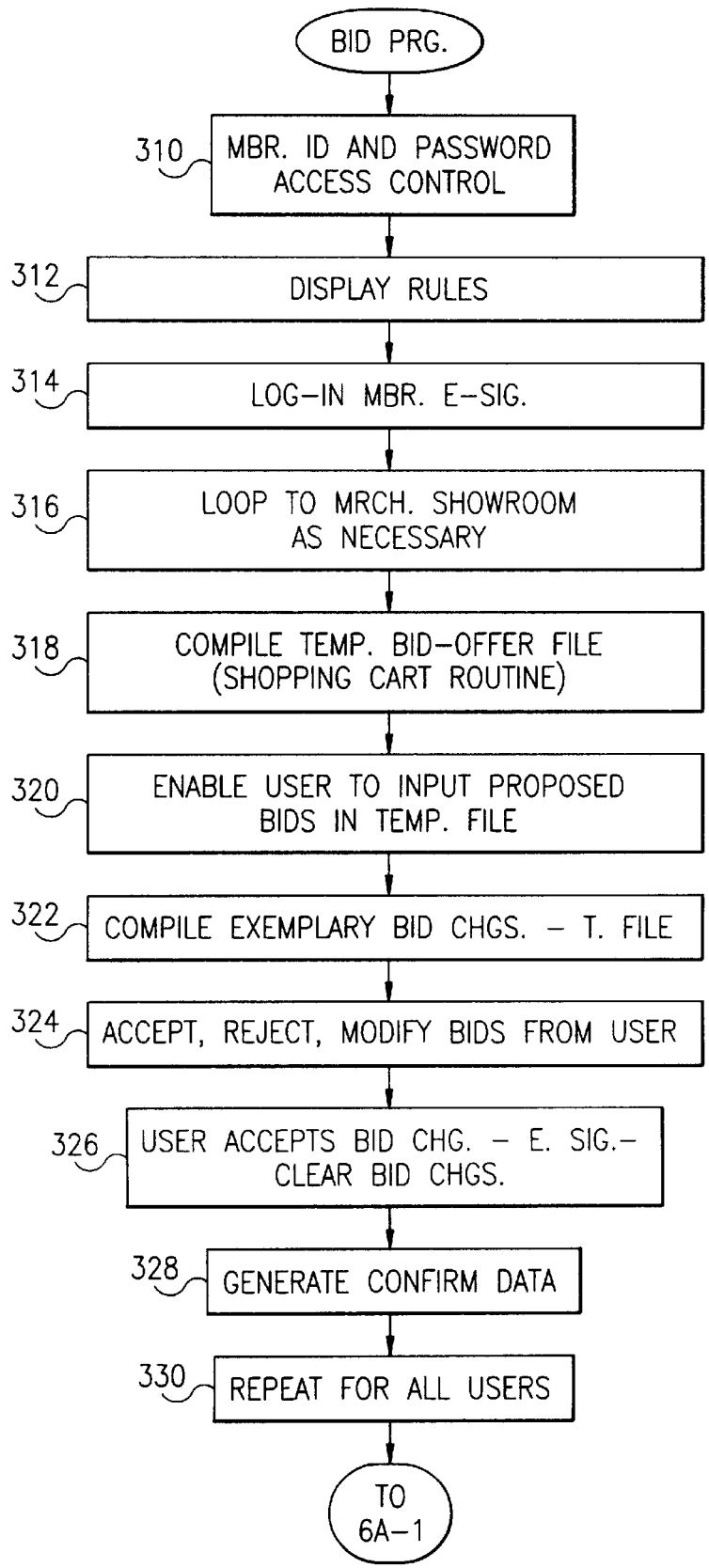
FIGS. 6A and 6B diagrammatically illustrate a bidding program.
Figure 6B:
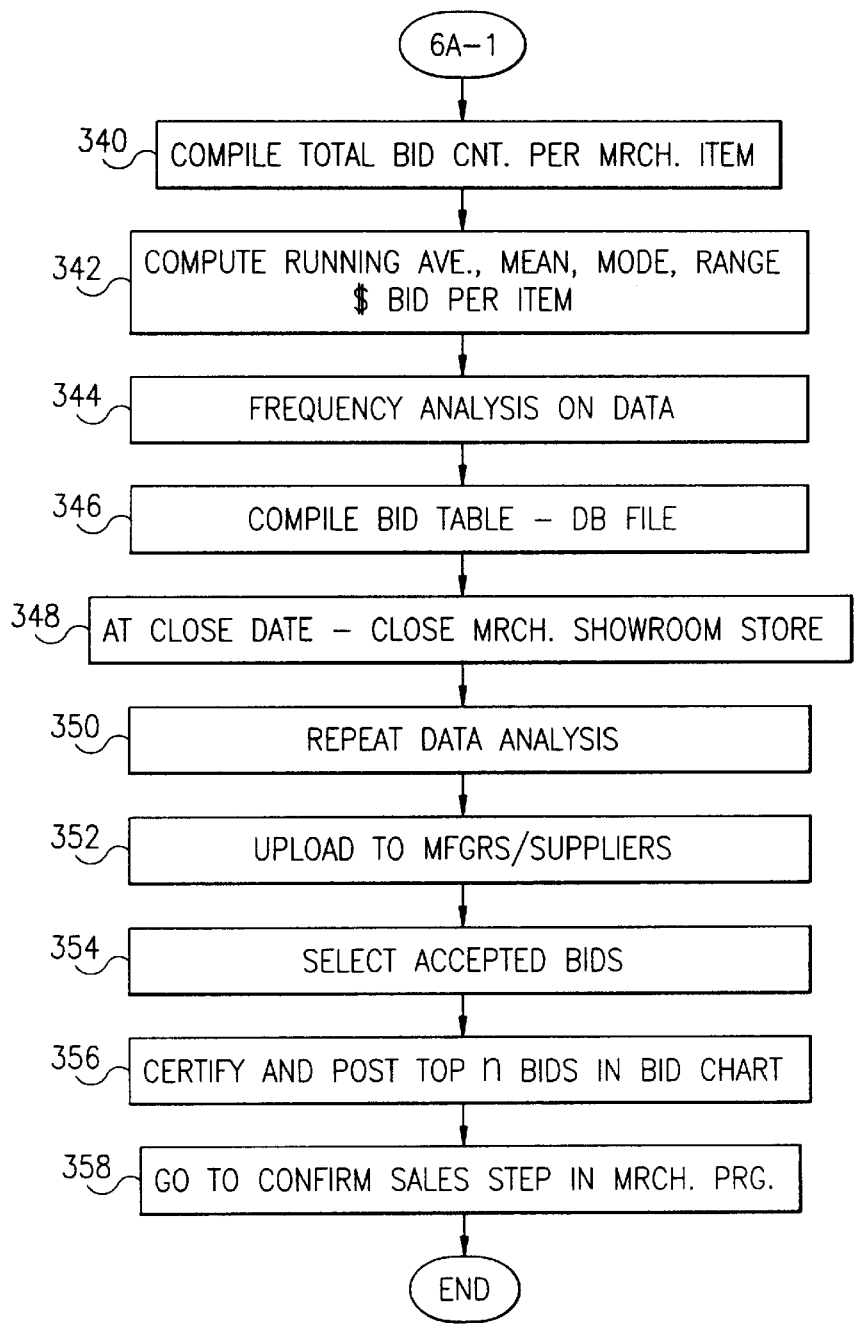

In a general sense after the customer/member has reviewed the merchandise in the virtual showroom, the member or customer should purchase or bid on the product by accessing the bid program. FIGS. 6A and 6B diagrammatically illustrate the major functional aspects of the bid program. In step 310, the member or customer provides the system with his or her identification number and password. This controls access to the bidding program. In step 312, the system electronically displays the rules associated with the electronic bid, auction and sales system. For example, one of the rules provides that there is a bid charge associated with each bid made by the customer or member. The customer or member should agree to this bid charge prior to activating the bid program. Step 314 logs in or records the member's electronic signature. This is acceptance of the rules by the customer or user. Step 316 enables the member or customer to jump or loop to the merchandise showroom as he or she sees fit. Step 318 compiles a temporary bid-offer file for the customer or member. By analogy, this is a shopping cart routine. The Temporary Bid-Offer File-Screen Table set forth below provides an example of this information.

Temporary Bid-Offer File-Screen
(Shopping Cart Routine)

Member Name
Member Pse

| Item 1 Description | Mfgr. | MSRP $ | Min'm open bid | Your bids | Est. bid charges |
|---|---|---|---|---|---|
| | | | | xx | |
| | | | | ww | |
| | | | | yy | |

No. of bids  3 × $3.00 = $9.00

Open date
Close date
Acceptance date

| Item 2 Description | Mfgr. | MSRP $ | Min'm open bid | Your bids | Est. bid charges |
|---|---|---|---|---|---|
| | | | | | |
| | | | | | |

No. of bids  × $5.00 = $_____

Total projected savings from MSRP   $_____

Total cost of bids - this transaction   $_____

Accept      Decline      More Stuff      See item detail

The electronic bid, auction and sale program generally simulates a shopping trip which the user/customer/member may take through a certain store in a real, physical shopping center. While in the store, the user may select various products or services which he or she may be interested in purchasing. However, before confirming the purchase, the user sometimes removes those items from the shopping cart. In the same manner, a customer or member may proceed, in an electronic manner, through the merchandise showroom established in computer system 20. The temporary bid-offer file enables the customer to locate a certain item and determine whether he or she wants to bid on that item. The temporary bid-offer table above identifies the member's name, member pseudonym and a brief description of each item selected, the manufacturer or supplier of that item, the manufacturer's suggested retail price, the minimum opening bid, the number of bids placed on that item by the customer and the estimated bid charges.

For example, the system operator may charge each customer $3 for each bid on items having an MSRP of between $10–$50. Bid charges of $5 may be assessed for items having an MSRP of $50–$150. Bid charges of $10 may be assessed for items having an MSRP between $150–$500. Accordingly, the user may place 3 bids against a certain item costing $45. The charge for those 3 bids is $9. The temporary bid-offer file also shows the user the total projected savings between his or her average bid and the manufacturer's suggested retail price (excluding bid charges). It may be necessary to list the bid charges next to the "savings" display. The total cost of all bids is also identified in the temporary bid offer file. The customer or member can accept all these bids and therefore actually post these bids with the system, decline or remove all these bids, add more items to the temporary bid-offer file or review the merchandise by selecting "See Item Detail" cross-link to the item description file-screen (common) discussed above.

Returning to FIG. 6A, step 320 enables the user/customer/member to input proposed bids in the temporary bid file. Step 322 compiles exemplary bid charges in the temporary file. Step 324 enables the customer to accept, reject or modify the bids as necessary. Step 326 requires that the customer or user accept the bid charges by inputting his or her electronic signature. Step 328 provides that the computer system generate an electronic confirmation note to the customer. This confirmation note may be via e-mail or may be an electronic note sent to call center 62. If call center 62 is activated, the call center initiates a voice communications channel with the user to confirm the bid. Step 330 repeats steps 310–328 for all user or members. The system then proceeds to jump point 6A-1 in FIG. 6B.

In step 340, the system electronically compiles the total bid count for each merchandise item offered for sale. In step 342, the system computes the running average bid for each item offered for sale, the mean of those bids, the mode and the range of all bids made and all bids accepted or awarded as "winning" bids. In step 344 the system conducts a frequency analysis on the bid data. This frequency analysis may be helpful to the system operator and to the suppliers and the manufacturers of the products and services. For example, if the sales of electronic equipment is heavily concentrated at Saturday between the hours of 5:00 and 11:00 p.m., it is important that the system operator keep the electronic store open during that time frame. On the other hand, the sales of automobiles may be concentrated during a time frame of Sunday, between 10:00 a.m. and 5:00 p.m. Further, a frequency analysis of the bidding price, the time of day the bids were posted, and even the geographic location of the members may be useful to the system operator. If the system operator wishes to enhance his sales position with the supplier or manufacturers of these products and services, the system operator could sell this information to the manufacturers and suppliers.

Step 346 compiles the bid table or data base file. The following Bid Table provides an example.

BID TABLE

| | (e.g. 1 item 4 units) | | | | |
|---|---|---|---|---|---|
| | Mbr1 | Mbr2 | Mbr3 | Mbr4 | Mbr5 |
| Bid | 38 | | | | |
| Bid | 32 | 32 | 31 | | 32 |
| Bid | 27 | | | 29 | |
| Bid | 22 | 24 | 20 | | |
| . | — | | | 18 | 15 |
| . | — | | | | |
| Bid chg. | $12 | $6 | $6 | $6 | $6 |
| Bit t. | t1 | t2 | t3 | t4 | t5 |

The bid table shows the total number of bids placed by each member, the amount of the bid, the bid charges for each member and the date and time the bid was received. In the exemplary bid table set forth above, four units were offered for sale by the system operator. For example, four pairs of NIKE shoes were offered for sale. Bids ranging from $38

(member 1) and $15 (member 5) were received and posted by the system. Since 4 units were offered for sale, the bid from member 1 was accepted as well as the bids from members 2, 3, and 5. The $32 bid from member 1 was accepted because it was the highest bid from all the bids submitted by all members and the $38 bid was excluded because it was higher than the $32 bid which was the lowest high bid from a single member. The $31 bid from member 3 was accepted because 4 units were offered for sale. Member 1 was charged $12 as a bid charge which reflects a $3 bid charge for each bid placed by the member. Accordingly, member 1 purchased the pair of shoes at a total price of $44, not including shipping, handling, and tax. Member 2 is charged $38 for the pair of shoes. This represents the $6 bid charge and the $32 charge for the pair of shoes.

If two members post identical bids, the system will award or accept the first posted bid and reject all other bids posted at a subsequent time. If the time as well as the date of bid posting is critical, the bid chart set forth above in conjunction with the Bid Checker File-Screen Table could be altered to include the time the bid was posted.

Returning to FIG. 6B, at step 348, the system closes the merchandise showroom store at the close date. It is important to establish a bidding cycle. The bidding cycle includes the initial date the bids will be posted, the last date and time the bids will be posted and the bid acceptance date and time. In this manner, goods and services can be advertised in the electronic showroom in order to spur the interest of customers and members. The pre-sale activity or traffic of these customers is useful information. The Bid Table set forth above is only available to the system operator.

In step 350, computer system 20 repeats the data analysis described above in connection with the merchandising or merchandise program. In step 352, this sale data and other relevant data is uploaded electronically to the computer systems of the manufacturers and suppliers. In step 354, the system operator selects or awards the accepted bid or bids. In step 356, outside consultants certify the bidding results and the system posts a predetermined number of bids in the bid chart. This bid chart is discussed above in connection with the Bid Checker File-Screen Table.

It is important that the system operator establish credibility with the public. The credibility of the system operator and the electronic bid, auction and sale system is enhanced by electronically publishing the bid charts. The bid chart shows the pseudonym of the member, the bid amount for all bids, including the high bids not accepted by the system (the bid checker file-screen set forth above did not accept the $38 bid but did accept the next highest $32 bid for member 1) as well as the bids closest to the winning bid. In this example, approximately 20 bids are shown for the bid chart for a particular item. In step 358, the system jumps to the confirm sales step 220 in the merchandise program shown in FIG. 4B. The bid program ends after step 358.

In order to establish a user friendly bid, auction and sale system, the member can access his or her account activity file or screen from the home page. As shown in FIG. 2, members access this information by inputting a password P113. FIG. 7 diagrammatically illustrates some typical information that would be presented to the user if he or she were reviewing the member account activity file. The account activity would include the member's name, the pseudonym for the member, his or her address and home and work telephone. The account file should have a period date, that is, those dates which are covered by the currently displayed activity file. One possible format for the member account activity file is to list, in chronological order, the date the user placed each bid, a short description of the items, the accepted bid (a-bid) for that item (if the acceptance date has passed), the amounts of the submitted bids during an open bidding cycle, the amount of any accepted bids, the ship date for the product and the confirmation number for that sale.

For example, the member account activity shown in FIG. 7 reveals that on May 1, 1997 the member placed four bids for one pair of NIKE shoes. The bids range from $22–$38. The electronic bid, auction and sale system accepted a $32 bid and the goods were shipped on May 9, 1997. The confirmation number XP321 is shown as a field in that data record. In contrast, the member placed two bids on May 15, 1997 for theater tickets. Since the bid cycle is still open, the account activity screen reveals that no bids have been accepted. A summary of the member's monthly bid charges is also provided. The system operator charged $3 per bid for the shoes and $5 per bid for the theater tickets. Accordingly, the $22 bid charge has been accessed against the member's American Express (AMX) credit card. This is reflected in the bid program (FIGS. 6A, 6B) in step 326 wherein the system clears a bid charge for all the bids posted by the member.

The member account activity screen also shows that on April 20 the member placed two bids on a Westinghouse stove. Since the member's bids were below the accepted bid of $265, the screen shows "NA" or not applicable. However, the member was charged $20 for placing two bids on the Westinghouse stove.

An important feature of the present invention is the presentation of the total amount of projected savings based upon the member's accepted bids and the manufacturer's suggested retail price (MSRP). The member account activity screen shows that the member saved $13 on the pair of NIKE shoes purchased via the electronic bid, auction and sale program.

The member account activity screen enables the user to jump or cross-link to other member data (for example the membership data base file screen table discussed above), member account history (previous account history not shown on the illustrated account activity screen), a cross-link to the item description file-screen (common) in order to again review information regarding the products purchased or bid on, the ability to go to the previous viewing page, the home or introduction page or to review the rules associated with the bid, auction and sale program.

Figure 8:
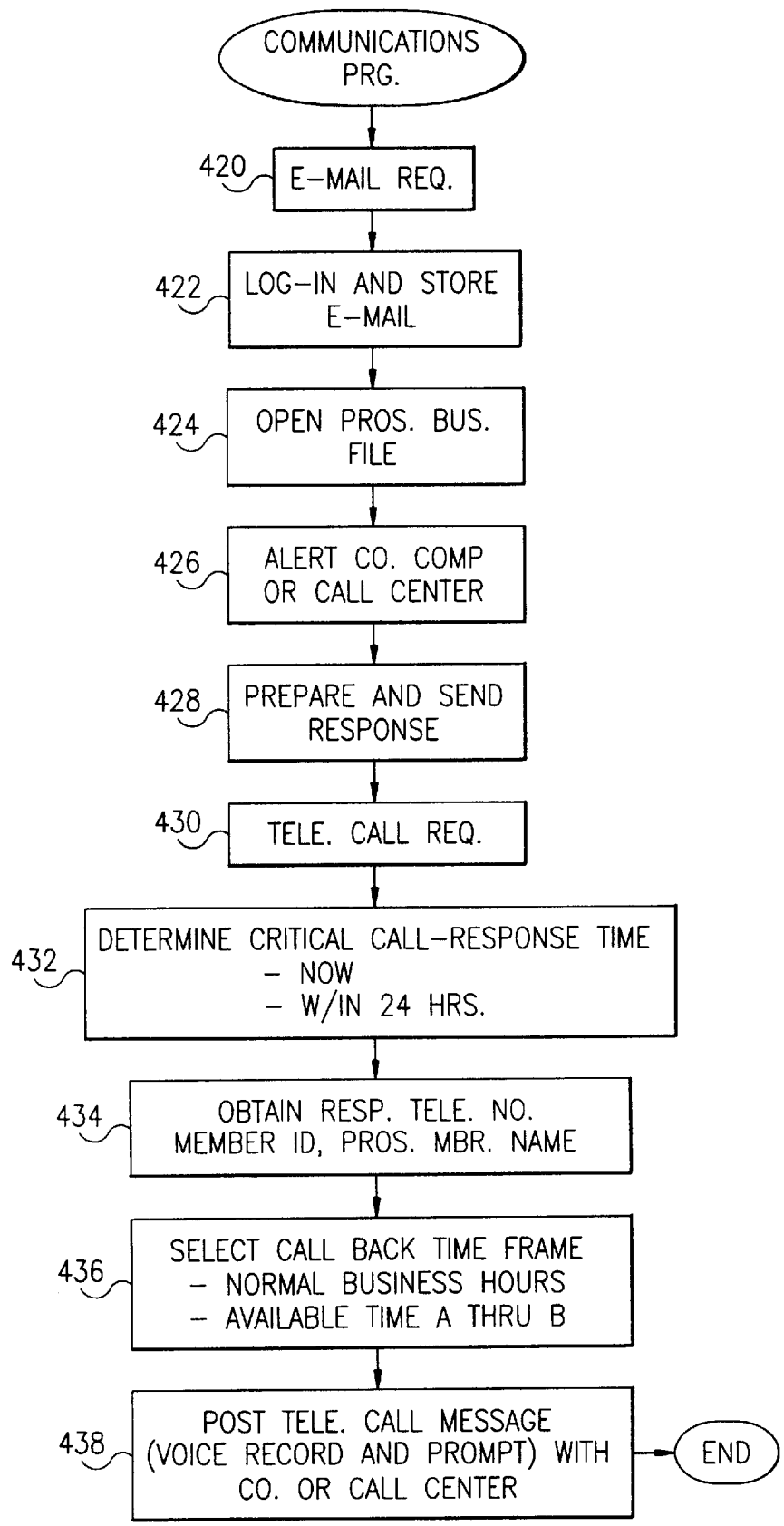
FIG. 8 diagrammatically illustrates the communications program.

Returning briefly to FIG. 2, it is important that the home page or introduction screen 110 for the electronic bid, auction and sale system provides an easy route to establish a communications link with the system operator. The communications program diagrammatically illustrated in FIG. 8 lists some of the major functional aspects of such a program. In step 420, the system has received an e-mail request from a user or customer. In step 422, the system logs in that e-mail request and stores the e-mail message. In step 424, the system opens a prospective business or prospective customer file. In step 426, the system alerts the system operator or formats an electronic message which is sent to the call center computer system 62. The system operator either at computer system 20 or the call center operator prepares and sends a response back to the caller in step 428.

In step 430, a telephone call request has been logged into computer system 20. A call system request may be in the form of an e-mail or may simply by an electronic request selected by the member. This electronic request would require that the system operator or the operator at the call center establish a voice or audio communications link with the member or the potential member. Step 432 establishes the criticality of the call. The criticality may be broken down into "call back immediately" or "call back within 24 hours". Other priority levels may be established. Step 434 obtains the member's telephone number from the membership data base, obtains the member's ID and/or the prospective member's name. Step 436 selects the proper call back time based on the criticality information and enables the member or prospective member to select the appropriate call back time. For example, the member may request that he or she be called back during normal business hours. Otherwise, the member could elect to be called back on a certain day from between two certain times (time a through time b). Step 438 electronically posts that telephone call message with either the system operator at computer system 20 or the call center operator at call center computer system 62. Of course, any comment from the prospective member or member should be logged into computer system 20 in order to refine and enhance the bid, auction and sale system.

From the introductory screen or home page 110 shown in FIG. 2, members or potential customers, in an effort to learn the rules regarding the electronic bid, auction and sale system, may select the interactive role or game play program shown in FIGS. 9A and 9B. In step 502, the system describes assignment of a member or customer ID, the assignment or selection by that member of a unique password and the various controls and encryption of financial data such as credit card information and e-bank information. In step 504, the system describes the rules associated with the bid, auction and sale system. These rules, include, among other things, that the system can only be utilized by consumers and that the consumers can only bid on one unit of a product or one unit of a service offered for sale. This rule excludes dealers or other retailers from purchasing goods. For example, if 200 pairs of NIKE shoes are available for sale in the electronic bid, auction and sale system, the consumer can only bid on the purchase of one pair of shoes. With respect to services, some services, such as vacations, can be purchased as packages. One unit for a single individual vacation; one unit for a couple's vacation; one unit for a vacation package for two adults and two children. Other rules such as the maximum bid rule also apply. For example, it is presently contemplated that the customer may place up to a maximum of 8 bids on a single unit of product or service. Bids in excess of 8 will not be accepted. Further, each bidder must pay the bid charge for each bid submitted at the time the bid is submitted. If the customer's credit card or e-bank refuses to honor the bid charge transaction, the bidder's bids are cleared or deleted from the system. Other rules such as payment for products and services on accepted bids and shipping and handling charges and data also apply to the use of the system.

In step 506, the system describes, either visually or audibly or by textual information a shopping trip through the merchandise showroom. On a visual level, this may include the display of the merchandise showroom-lobby level screen (FIG. 5) and then the cursor automatically selecting the electronic store and, as an example, a member entering the electronic store, selecting a particular item by automatic cursor control from the electronic store, thereafter reviewing the item description file-screen (common). This shopping trip is driven by the computer system. Thereafter, the example may shift from the electronic store to the women's clothing store.

Step 508 in FIG. 9A illustrates the system selecting one store from the showroom (i.e., the electronics store). In step 510, the system assigns a temporary member ID to the player or potential customer. In step 512, the system enables the player or potential customer to compile a temporary bid-offer file. The temporary bid-offer file-screen table is discussed above. In step 514, the system describes how the user/member/customer posts bids and confirms the posting of those bids with an electronic signature. In step 516, the system initially explains a bidding cycle and then displays an exemplary bidding cycle. For example, if a ten day bidding cycle is available for a certain product, the system may establish a time compression routine wherein six seconds equals one day in the bidding cycle.

The user or potential customer places a fictitious bid on a certain product. Thereafter, the system generates a plurality of other fictitious bids from other fictitious members and compiles a bid chart shown above in connection with the Bid Checker File-Screen Table. The bid chart table is displayed and the player or potential member sees the chart being filled during a time frame of six seconds which is equivalent to one day. Alternatively, the system could display and fill with fictitious bids the Bid Table shown and described above. In any event, the user or potential customer dynamically views how the electronic bid, auction and sale system compiles bids from a plurality of customers or members and then selects the winning bids. In step 518, the system describes the close date for the bids, the bid acceptance date and the certification and posting of the top n bids in the bid chart. In the preferred embodiment, the 20 top bids are displayed in the bid chart. The bid chart is found in the Bid Checker File-Screen Table discussed above.

In order to enhance the credibility of the electronic bid, auction and sale system, the accepted bids are certified by an accountant or a group of individuals not employed by the company operating the electronic bid, auction and sale system. The interactive or I.A. role play or game play program jumps to jump point 9A-1 in FIG. 9B. In step 520, the system describes how the user/member/customer is informed of the accepted bid by e-mail, voice communications via the call center and the communications program. For example, after the system accepts winning bids, the winning bidders are notified by e-mail and, if appropriate, notified by establishing an audio channel or voice communications link with the bidder. This may occur directly from computer system 20 (FIG. 1) or from the call center computer system 62. If the call center system is remote from computer system 20 an electronic e-mail message would be sent to the call center notifying the operator at the call center to establish a voice communications link with the bidder in costumer computer 10. The call center, after reaching the winning bidder, electronically confirms the sale with system 20.

Step 522 in FIG. 9B describes the follow-up procedures to ensure that the goods or services have been delivered to the winning bidder or customer. The system, from step 522, branches to enable the potential member to go to the membership program at jump point 524 or to a decision step 526. In the exemplary flow chart illustrated in FIG. 9B, if the member has made two trips through the role play or game, the potential member is automatically shifted to the membership program via jump point 524. If not, the member is given the option to return to step 508 via jump point 528. This enables the potential member to game play again with the system in order to determine whether he or she has "won" or been awarded a fictitious winning bid for a particular product or service. The potential savings to the customer is also displayed during this game.

It is believed that the role play or game play component of the present system is an important feature because the game play is entertainment and because the game play enables the potential member or an existing member to refine his or her bidding skills. Further, the number of members playing the bid and auction game may be an indication of consumer interest regarding a particular product or a particular store established in the electronic bid, auction and sale system. This information is important not only to the system operator but also to the manufacturer and the supplier of that particular product or service.

There are several methods to define the extent of the role play or game play. The game play store selection table set forth above provides some options.

Game Play Store Selection

1. Rotate players through stores
   a. Autos
   b. Appliances
   c. Small electronics
   d. Computers
   e. Women's clothing
   f. Linen
   g. Vacation
2. Day of week, time of day sequencing
   a. Assign day-time game play cycles to stores in showroom
3. Limit game players to certain goods in certain stores.
4. Limit game players to stores that are "closed" to bidding members
5. Limit number of games players allowed in each store It should be appreciated that rather than establish a fixed routine for the merchandise showroom, access to a particular store during the game play routine may not be the best way to promote the electronic bid, auction and sale system. Potential members and actual members should be provided with some variety. This variety can be provided by selecting, on a rotating daily or hourly basis, certain stores that may be accessed during the interactive game or role play program. For example, automobiles may be included in the game on Sunday, appliances may be available on Monday, small electronics may be available on Tuesday, etc. Alternatively, the system could rotate players through the stores. The first potential member playing the game could be placed in the automobile store, the second member or potential customer could be placed in the appliance store, the third member in the small electronic store, etc. Further, in order to limit the activity on the Website, there may be a limit to the number of game players permitted in a certain store, or, the game players in a store may only be permitted to fictitiously bid on certain goods illustrated or found in the store. Lastly, the game players could be permitted into stores that are closed to actual or genuine bidders.

The last branch from the introductory screen or home page 110 in FIG. 2 is the selection by a member or a potential customer of the company profile branch. The company profile provides a brief description of the company and some company credentials. If the company has obtained critical acclaim or favorable reviews, these reviews are posted in the company profile branch. Also, in order to spur sales and utilization of the electronic bid, auction and sale system, the company profile branch may include the sample sales table diagrammatically illustrated in FIG. 10.

The sample sales screen in FIG. 10 reveals actual goods and/or services that have been sold to members. A small illustration of the products, information regarding the manufacturer, brand and model, the manufacturer's suggested retail price, the winning bid or sales price and the estimated amount of sales is illustrated for each product. The estimated savings is the difference between the MSRP and the winning bid price. The sample sale screen should also list how many items or units were sold of that quantity. The open and close date and the bid acceptance date provides an indication to the member or potential customer of the bid cycle and when the bids are accepted by the system operator. Lastly, the sample sales screen enables the viewer to jump to the membership new accounts via a cross-link, to review merchandise in the merchandise showroom, to go to the previous view screen, to jump back to the introduction or home page, to review the rules associated with the electronic bid, auction and sales system or to view "more stuff" or an additional sample sales screen.

Although an electronic system for bidding and purchasing products and services has been described herein, the system can be integrated with call center computer system 62. With the availability of an audio or voice channel established between call center computer system 62 and the customer at customer computer 10, the customer may preregister with the call center computer system. The preregistration by call center 62 works dynamically with computer system 20 handling the electronic bid, auction and sale system. In other words, when a potential member establishes a voice link with call center 62, the operator at call center 62 establishes an electronic computer link between computer system 62 and computer system 20. The call center operator then completes, with the assistance of the potential member at telephone 13 the Membership Data Base File-Screen Table discussed above. After completion of the membership data screen, the call center operator at computer system 62, with the electronic input from computer system 20, assigns a member ID and particular passwords to the customer or member at telephone 13 and customer computer 10. The customer at customer computer 10 may want to role play either electronically via customer computer 10 or audibly via call center 62. The member may want to select one or more fictitious bids for a product, the computer system 20 could generate fictitious bids and the operator at call center 62 would announce whether the fictitious bids placed by the customer were classified as "winning fictitious bids". However, it is believed that an electronic game play established by an electronic linkage between customer computer 10 and computer system 20 handling the electronic bid, auction and sale system provides a better teaching method to display the rules for the electronic bid, auction and sale system as well as to provide entertainment services to the customer.

The customer may place a bid via call center 62 and that bid, after being entered by the operator at call center 62 would be electronically posted at computer system 20. After the close of the bid cycle and on the acceptance date, computer system 20 would then award the winning bids and identify the winning bidders. Computer system 20 then posts these winning bids and compiles the publicly available bid chart discussed above in connection with the Bid Checker File-Screen Table. Thereafter, computer system 20 could compile an electronic file identifying the winning bids, the amount of those bids, the members' names, e-mail address and telephone numbers and other member data and electronically ship that information to call center computer system 62. The operator at call center computer system 62 could then open a voice or audio channel with the customer at telephone 13 to notify the customer that he or she is the winning bidder. Thereafter, the operator at call center 62 could confirm the sale, establish a method of payment and confirm the ship date of the goods.

Other interaction between the computer system 20 and call center computer system 62 is discussed in detail above in connection with FIGS. 1–10.

The claims appended hereto are meant to cover modifications and changes within the scope and spirit of the present invention.

What is claimed is:

1. A computer-based method of purchasing consumer products and consumer services via an electronic bid, auction and sale comprising the steps of:

providing a computer system for the electronic bid, auction and sales of a plurality of consumer products and services, providing a plurality of customer computers operated by customers and providing access to said computer system by said plurality of computers with a telecommunications system linking said computer system and said plurality of computers;

electronically establishing a virtual showroom on said computer system, said virtual showroom being accessible by said plurality of customer computers and including electronic displays of said plurality of consumer products and services which are offered for sale;

electronically displaying the following textual information for each one of said plurality of products and services:

information regarding a commonly available selling price for each one of said plurality of products and services, a minimum opening bid price, information regarding the make, model and manufacturer or supplier of said plurality of products and services, and bid cycle data revealing when a bid period is open and when bids will be accepted for each one of said products and services;

electronically blocking customers from becoming bidders and posting bids until said customers have electronically pre-registered;

electronically posting all bids received for each one of said plurality of products and services during said bid period;

accepting the highest bid submitted for the sale of one of said plurality of products and services from all bids submitted by said bidders and excluding all bids greater than the lowest high bid from a group of bids submitted by a single bidder for said one of said plurality of products and services;

electronically consummating the sale of said one of said plurality of products and services to the highest bidder via electronic confirmation;

accepting an electronic payment of funds from each bidder for each bid based upon the number of bids submitted by said bidder;

for customers who have not pre-registered, permitting said customer to place fictitious bids for one or more of said plurality of products and services, posting said fictitious bids, generating a plurality of computer generated fictitious bids responsive to the posted fictitious bids, fictitiously accepting the highest bid from all fictitious bids while excluding all fictitious bids greater than the lowest high fictitious bid from a group of fictitious bids submitted by said customer for said one or more of said plurality of products and services, and fictitiously assessing a charge for each fictitious bid submitted by said customer thereby teaching said customer how the bid and auction purchasing system works; and, electronically posting all winning and accepted bids and documenting the sale of said plurality of products and services purchased by bidders.

2. A computer-based method of purchasing as claimed in claim 1 including the step of functionally grouping together said plurality of products and services in said virtual showroom.

3. A computer-based method of purchasing as claimed in claim 1 including the step of permitting pre-registered customers to place fictitious bids and the step of fictitiously assessing a charge for each fictitious bid submitted by said customer thereby permitting the pre-registered customer to shop for a group of said plurality of products and services prior to the step of electronically posting bids.

4. A computer-based method of purchasing as claimed in claim 1 including the step of electronically gathering warranty information from said manufacturer or supplier of said plurality of products and services and electronically displaying said warranty information with said textual information.

5. A computer-based method of purchasing as claimed in claim 1 wherein the step of electronically consummating via an electronic confirmation includes the step of establishing an audio telecommunications link between said highest bidder and said computer system.

6. A computer-based method of purchasing as claimed in claim 1 including the step of electronically pre-registering said customers.

7. A computer-based method of purchasing as claimed in claim 6 wherein the step of electronically pre-registering includes the step of establishing an audio telecommunications link between said customer and said computer system.

8. A computer-based method of purchasing as claimed in claim 1 wherein the step of electronically posting all bids is conducted in said computer system and said customer computers are not permitted access thereto and wherein the step of electronically posting all winning and accepted bids includes the step of electronically displaying all winning and accepted bids to all customers.

9. A computer-based method of purchasing as claimed in claim 8 wherein the step of electronically displaying all winning and accepted bids to all customers includes the step of displaying a predetermined number of non-winning bids proximate to said winning and accepted bids.

10. A computer-based method of purchasing as claimed in claim 9 including the step of permitting pre-registered customers to place fictitious bids and the step of fictitiously assessing a charge for each fictitious bid submitted by said customer thereby permitting the pre-registered customer to shop for a group of said plurality of products and services prior to the step of electronically posting bids.

11. A computer-based method of purchasing as claimed in claim 10 including the step of electronically gathering warranty information from said manufacturer or supplier of said plurality of products and services and electronically displaying said warranty information with said textual information.

12. A computer-based method of purchasing as claimed in claim 11 wherein the step of electronically consummating via an electronic confirmation includes the step of establishing an audio telecommunications link between said highest bidder and said computer system.

13. A computer-based method of purchasing as claimed in claim 12 including the step of electronically pre-registering said customers.

14. A computer-based method of purchasing as claimed in claim 13 wherein the step of electronically pre-registering includes the step of establishing an audio telecommunications link between said customer and said computer system.

15. A computer-based method of selling a plurality of consumer products and services via an electronic bid, auction and sale method with a computer system accessible by a plurality of customer computers operated by customers via a telecommunications system, the computerized electronic bid, auction and sale method comprising the steps of:

electronically establishing a virtual showroom on said computer system accessible by said plurality of customer computers, said showroom including electronic displays of said plurality of consumer products and services which are offered for sale, displayed information regarding a commonly available selling price for each product and service offer, a minimum opening bid price, information regarding the make, model and manufacturer or supplier of said product and service offer, and bid cycle data revealing an open, close and acceptance date for bids;

electronically blocking customers from becoming bidders and posting bids until said customers have electronically pre-registered;

electronically posting all bids received for each one of said plurality of products and services during said bid period;

accepting the highest bid submitted for the sale of one of said plurality of products and services from all bids submitted by said bidders and excluding all bids greater than the lowest high bid from a group of bids submitted by a single bidder for said one of said plurality of products and services;

electronically consummating the sale of said one of said plurality of products and services to the highest bidder via electronic confirmation;

accepting an electronic payment of funds from each bidder for each bid based upon the number of bids submitted by said bidder;

for customers who have not pre-registered, providing a game play wherein customers place fictitious bids, the computer system generates a plurality of computer generated fictitious bids responsive to the customers' fictitious bids, the computer system fictitiously accepts the highest bid while excluding all fictitious bids greater than the lowest high fictitious bid from single customer, and fictitiously assesses a charge for each fictitious bid submitted by customers; and, electronically posting and displaying all winning and accepted bids and documenting the sale of said plurality of products and services purchased by bidders.

16. A computer-based method of selling as claimed in claim 15 wherein the step of electronically posting all bids is not electronically displayed to said customers and wherein the step of electronically posting all winning and accepted bids includes the step of electronically displaying all winning and accepted bids to all customers.

17. A computer-based method of selling as claimed in claim 16 wherein the step of electronically displaying all winning and accepted bids to all customers includes the step of displaying a predetermined number of non-winning bids proximate to said winning and accepted bids.

18. A computer-based method of selling as claimed in claim 17 including the step of permitting pre-registered customers to game play.

19. A computer-based method of selling as claimed in claim 18 including the step of electronically gathering warranty information from said manufacturer or supplier of said plurality of products and services and electronically displaying said warranty information with other product and service information.

20. A computer-based method of selling consumer products and consumer services via an electronic bid, auction and sale comprising the steps of:

providing a distributed computer system for the electronic bid, auction and sales of a plurality of consumer products and services, providing a voice communications center, providing a plurality of customer computers operated by customers and associated voice communications equipment, and providing access, via a telecommunications system, to said distributed computer system by said plurality of customer computers and said voice communications center;

electronically establishing a virtual showroom on said computer system, said virtual showroom being accessible by said plurality of customer computers and said voice communications center and said showroom including electronic displays of said plurality of consumer products and services which are offered for sale, displayed information regarding a commonly available selling price for each product and service offer, a minimum opening bid price, information regarding the make, model and manufacturer or supplier of said product and service offer, and bid cycle data revealing an open, close and acceptance date for bids;

pre-registering customers with said distributed computer system via said voice communications center;

electronically blocking customers from becoming bidders and posting bids until said customers have electronically pre-registered;

electronically posting all bids received for each one of said plurality of products and services during said bid period;

accepting the highest bid submitted for the sale of one of said plurality of products and services from all bids submitted by said bidders and excluding all bids greater than the lowest high bid from a group of bids submitted by a single bidder for said one of said plurality of products and services;

electronically consummating the sale of said one of said plurality of products and services to the highest bidder via electronic confirmation associated with said voice communications center;

accepting an electronic payment of funds from each bidder for each bid based upon the number of bids submitted by said bidder;

for customers who have not pre-registered, permitting said customer via said voice communications center to place fictitious bids for one or more of said plurality of products and services, posting said fictitious bids, fictitiously accepting the highest bid from all fictitious bids while excluding all fictitious bids greater than the lowest high fictitious bid from a group of fictitious bids submitted by said customer for said one or more of said plurality of products and services, and fictitiously assessing a charge for each fictitious bid submitted by said customer thereby teaching said customer how the bid and auction purchasing system works via said voice communications center; and, electronically posting all winning and accepted bids and documenting the sale of said plurality of products and services purchased by bidders.

21. A computer-based method of selling as claimed in claim 20 wherein the step of electronically posting all winning and accepted bids includes the step of displaying a predetermined number of non-winning bids proximate to said winning and accepted bids via said voice communications center.

* * * * *